US012219986B2

(12) United States Patent
Blandino et al.

(10) Patent No.: US 12,219,986 B2
(45) Date of Patent: Feb. 11, 2025

(54) ARTICLE FOR USE WITH APPARATUS FOR HEATING SMOKABLE MATERIAL

(71) Applicant: Nicoventures Trading Limited, London (GB)

(72) Inventors: Thomas P. Blandino, Cottage Grove, WI (US); Andrew Wilke, Madison, WI (US); James J Frater, Madison, WI (US); Benjamin J. Paprocki, Cottage Grove, WI (US)

(73) Assignee: NICOVENTURES TRADING LIMITED, London (GB)

( * ) Notice: Subject to any disclaimer, the term of this patent is extended or adjusted under 35 U.S.C. 154(b) by 0 days.

(21) Appl. No.: 18/489,115

(22) Filed: Oct. 18, 2023

(65) Prior Publication Data

US 2024/0041095 A1 Feb. 8, 2024

Related U.S. Application Data

(63) Continuation of application No. 17/187,077, filed on Feb. 26, 2021, now Pat. No. 11,825,870, which is a (Continued)

(51) Int. Cl.
*A24C 5/01* (2020.01)
*A24D 1/20* (2020.01)

(Continued)

(52) U.S. Cl.
CPC .................. *A24C 5/01* (2020.01); *A24D 1/20* (2020.01); *H05B 6/105* (2013.01); *A24F 40/20* (2020.01);

(Continued)

(58) Field of Classification Search
CPC ...... A24C 5/01; A24D 1/20; H05B 2206/023; H05B 6/105; A24F 40/20; A24F 40/465
See application file for complete search history.

(56) References Cited

U.S. PATENT DOCUMENTS 219,628 A 9/1879 Edison
219,634 A 9/1879 Gifford (Continued)

FOREIGN PATENT DOCUMENTS

AT 262137 B 5/1968
AT 306224 B 3/1973

(Continued)

OTHER PUBLICATIONS

Atomization Device Applicable to Solid Tobacco Materials and Electronic Cigarette, CN203762288U, retrieved from Google Patents <https://patents.google.com/patenUCN203762288U/en> on Jan. 12, 2018, 10 pages.

(Continued)

*Primary Examiner* — Joe E Mills, Jr.
(74) *Attorney, Agent, or Firm* — BURR & FORMAN LLP

(57) ABSTRACT

Disclosed is an article for use with apparatus for heating smokable material to volatilize at least one component of the smokable material. The article includes a smokable material, such as tobacco, and a heater for heating the smokable material. The heater comprises heating material that is heatable by penetration with a varying magnetic field. The heating material has a Curie point temperature that is less than the combustion temperature of the smokable material.

20 Claims, 2 Drawing Sheets

Related U.S. Application Data continuation of application No. 15/772,386, filed as application No. PCT/EP2016/075739 on Oct. 26, 2016, now abandoned, which is a continuation of application No. 14/927,532, filed on Oct. 30, 2015, now abandoned.

(51) Int. Cl.
*A24F 40/20* (2020.01)
*A24F 40/465* (2020.01)
*H05B 6/10* (2006.01)

(52) U.S. Cl.
CPC ...... *A24F 40/465* (2020.01); *H05B 2206/023* (2013.01)

(56) References Cited

U.S. PATENT DOCUMENTS

| | | | |
|---|---|---|---|
| 219,635 | A | 9/1879 | Giles |
| 219,643 | A | 9/1879 | Mattoni |
| 2,462,563 | A | 2/1949 | Seyforth |
| 2,689,150 | A | 9/1954 | Croce |
| 2,888,208 | A | 5/1959 | Rene |
| 3,040,991 | A | 6/1962 | Rene |
| 3,043,524 | A | 7/1962 | Sonia |
| 3,144,174 | A | 8/1964 | Henry |
| 3,258,015 | A | 6/1966 | Drummond et al. |
| 3,289,949 | A | 12/1966 | Willy |
| 3,347,231 | A | 10/1967 | Chien-hshuing |
| 3,522,806 | A | 8/1970 | Szekely |
| 3,647,143 | A | 3/1972 | Gauthier et al. |
| 3,658,059 | A | 4/1972 | Steil |
| 3,733,010 | A | 5/1973 | Riccio |
| 3,856,185 | A | 12/1974 | Riccio |
| 3,864,326 | A | 2/1975 | Babington |
| 3,913,843 | A | 10/1975 | Cambio |
| 3,943,942 | A | 3/1976 | Anderson et al. |
| 4,017,701 | A | 4/1977 | Mittelmann |
| 4,149,548 | A | 4/1979 | Bradshaw |
| 4,284,089 | A | 8/1981 | Ray |
| 4,299,274 | A | 11/1981 | Campbell |
| 4,299,355 | A | 11/1981 | Haekkinen |
| 4,303,541 | A | 12/1981 | Wasel-nielen et al. |
| 4,393,884 | A | 7/1983 | Jacobs |
| 4,429,835 | A | 2/1984 | Brugger et al. |
| 4,746,067 | A | 5/1988 | Svoboda |
| 4,765,348 | A | 8/1988 | Honeycutt |
| 4,771,795 | A | 9/1988 | White et al. |
| 4,776,353 | A | 10/1988 | Lilja et al. |
| 4,819,665 | A | 4/1989 | Roberts et al. |
| 4,827,950 | A | 5/1989 | Banerjee et al. |
| 4,907,606 | A | 3/1990 | Lilja et al. |
| 4,913,168 | A | 4/1990 | Potter et al. |
| 4,917,119 | A | 4/1990 | Potter et al. |
| 4,917,120 | A | 4/1990 | Hill |
| 4,924,883 | A | 5/1990 | Perfetti et al. |
| 4,938,236 | A | 7/1990 | Banerjee et al. |
| 4,941,483 | A | 7/1990 | Ridings et al. |
| 4,947,874 | A | 8/1990 | Brooks et al. |
| 4,955,399 | A | 9/1990 | Potter et al. |
| 4,979,521 | A | 12/1990 | Davis et al. |
| 4,987,291 | A | 1/1991 | Mcgaffigan et al. |
| 4,991,606 | A | 2/1991 | Serrano et al. |
| 5,019,122 | A | 5/1991 | Clearman et al. |
| 5,020,509 | A | 6/1991 | Suzuki et al. |
| 5,040,552 | A | 8/1991 | Schleich et al. |
| 5,042,509 | A | 8/1991 | Banerjee et al. |
| 5,060,667 | A | 10/1991 | Strubel |
| 5,060,671 | A | 10/1991 | Counts et al. |
| 5,076,292 | A | 12/1991 | Sensabaugh et al. |
| 5,080,115 | A | 1/1992 | Templeton |
| 5,093,894 | A | 3/1992 | Deevi et al. |
| 5,095,921 | A | 3/1992 | Losee et al. |
| 5,097,850 | A | 3/1992 | Braunshteyn et al. |
| 5,099,861 | A | 3/1992 | Clearman et al. |
| 5,105,831 | A | 4/1992 | Banerjee et al. |
| 5,119,834 | A | 6/1992 | Shannon et al. |
| 5,133,368 | A | 7/1992 | Neumann et al. |
| 5,144,962 | A | 9/1992 | Counts et al. |
| 5,146,934 | A | 9/1992 | Deevi et al. |
| 5,159,940 | A | 11/1992 | Hayward et al. |
| 5,167,242 | A | 12/1992 | Turner et al. |
| 5,179,966 | A | 1/1993 | Losee et al. |
| 5,188,130 | A | 2/1993 | Hajaligol et al. |
| 5,224,498 | A | 7/1993 | Deevi et al. |
| 5,230,715 | A | 7/1993 | Tizuna et al. |
| 5,235,992 | A | 8/1993 | Sensabaugh |
| 5,249,586 | A | 10/1993 | Morgan et al. |
| 5,261,424 | A | 11/1993 | Sprinkel |
| 5,269,327 | A | 12/1993 | Counts et al. |
| 5,272,216 | A | 12/1993 | Clark et al. |
| 5,285,798 | A | 2/1994 | Banerjee et al. |
| 5,293,883 | A | 3/1994 | Edwards |
| 5,312,046 | A | 5/1994 | Knoch et al. |
| 5,322,075 | A | 6/1994 | Deevi et al. |
| 5,327,915 | A | 7/1994 | Porenski et al. |
| 5,345,951 | A | 9/1994 | Serrano et al. |
| 5,357,984 | A | 10/1994 | Farrier et al. |
| 5,369,723 | A | 11/1994 | Counts et al. |
| 5,396,911 | A | 3/1995 | Casey et al. |
| 5,400,808 | A | 3/1995 | Turner et al. |
| 5,408,574 | A | 4/1995 | Deevi et al. |
| 5,412,183 | A | 5/1995 | Buffenoir et al. |
| 5,415,186 | A | 5/1995 | Casey et al. |
| 5,443,560 | A | 8/1995 | Deevi et al. |
| 5,454,363 | A | 10/1995 | Sata |
| 5,461,695 | A | 10/1995 | Knoch |
| 5,474,059 | A | 12/1995 | Cooper |
| 5,483,953 | A | 1/1996 | Cooper |
| 5,500,511 | A | 3/1996 | Hansen et al. |
| 5,501,236 | A | 3/1996 | Hill et al. |
| 5,502,743 | A | 3/1996 | Conochie et al. |
| 5,511,538 | A | 4/1996 | Haber et al. |
| 5,517,981 | A | 5/1996 | Taub et al. |
| 5,534,020 | A | 7/1996 | Cheney et al. |
| 5,538,020 | A | 7/1996 | Farrier et al. |
| 5,549,906 | A | 8/1996 | Santus |
| 5,564,442 | A | 10/1996 | Macdonald et al. |
| 5,591,368 | A | 1/1997 | Fleischhauer et al. |
| 5,593,792 | A | 1/1997 | Farrier et al. |
| 5,613,505 | A | 3/1997 | Campbell et al. |
| 5,645,749 | A | 7/1997 | Wang |
| 5,649,554 | A | 7/1997 | Sprinkel et al. |
| 5,659,656 | A | 8/1997 | Das |
| 5,687,912 | A | 11/1997 | Denyer |
| 5,699,786 | A | 12/1997 | Oshima et al. |
| 5,711,292 | A | 1/1998 | Hammarlund |
| 5,726,421 | A | 3/1998 | Fleischhauer et al. |
| 5,736,110 | A | 4/1998 | Angelillo et al. |
| 5,778,899 | A | 7/1998 | Saito et al. |
| 5,837,088 | A | 11/1998 | Palmgren et al. |
| 5,845,649 | A | 12/1998 | Saito et al. |
| 5,865,185 | A | 2/1999 | Collins et al. |
| 5,865,186 | A | 2/1999 | Volsey |
| 5,878,752 | A | 3/1999 | Adams et al. |
| 5,902,501 | A | 5/1999 | Nunnally et al. |
| 5,921,233 | A | 7/1999 | Gold et al. |
| 5,935,486 | A | 8/1999 | Bell et al. |
| 5,938,125 | A | 8/1999 | Ritsche et al. |
| 6,000,394 | A | 12/1999 | Blaha-schnabel et al. |
| 6,026,820 | A | 2/2000 | Baggett et al. |
| 6,041,790 | A | 3/2000 | Smith et al. |
| 6,053,176 | A | 4/2000 | Adams et al. |
| 6,079,405 | A | 6/2000 | Justo |
| 6,085,741 | A | 7/2000 | Becker |
| 6,089,857 | A | 7/2000 | Matsuura et al. |
| 6,113,078 | A | 9/2000 | Rock |
| 6,125,853 | A | 10/2000 | Susa et al. |
| 6,129,080 | A | 10/2000 | Pitcher et al. |
| 6,158,676 | A | 12/2000 | Hughes |
| 6,164,287 | A | 12/2000 | White |
| 6,178,963 | B1 | 1/2001 | Baik |
| 6,209,457 | B1 | 4/2001 | Kenworthy et al. |

(56) References Cited

U.S. PATENT DOCUMENTS

| | | | |
|---|---|---|---|
| 6,223,745 | B1 | 5/2001 | Hammarlund et al. |
| 6,230,703 | B1 | 5/2001 | Bono |
| 6,234,459 | B1 | 5/2001 | Rock |
| 6,244,573 | B1 | 6/2001 | Rock |
| 6,248,257 | B1 | 6/2001 | Bell et al. |
| 6,267,110 | B1 | 7/2001 | Tenenboum et al. |
| 6,283,116 | B1 | 9/2001 | Yang |
| 6,289,889 | B1 | 9/2001 | Bell et al. |
| 6,297,483 | B2 | 10/2001 | Sadahira et al. |
| 6,347,789 | B1 | 2/2002 | Rock |
| 6,427,878 | B1 | 8/2002 | Greiner-perth et al. |
| 6,595,209 | B1 | 7/2003 | Rose et al. |
| 6,598,607 | B2 | 7/2003 | Adiga et al. |
| 6,648,306 | B2 | 11/2003 | Rock |
| 6,669,176 | B2 | 12/2003 | Rock |
| 6,708,846 | B1 | 3/2004 | Fuchs et al. |
| 6,761,164 | B2 | 7/2004 | Amirpour et al. |
| 6,769,436 | B2 | 8/2004 | Horian |
| 6,799,572 | B2 | 10/2004 | Nichols et al. |
| 6,803,545 | B2 | 10/2004 | Blake et al. |
| 6,803,550 | B2 | 10/2004 | Sharpe et al. |
| 6,886,556 | B2 | 5/2005 | Fuchs |
| 6,968,888 | B2 | 11/2005 | Kolowich |
| 6,994,096 | B2 | 2/2006 | Rostami et al. |
| 7,041,123 | B2 | 5/2006 | Stapf et al. |
| 7,077,130 | B2 | 7/2006 | Nichols et al. |
| 7,081,211 | B2 | 7/2006 | Li et al. |
| 7,088,914 | B2 | 8/2006 | Whittle et al. |
| 7,163,014 | B2 | 1/2007 | Nichols et al. |
| 7,185,659 | B2 | 3/2007 | Sharpe |
| 7,234,459 | B2 | 6/2007 | Del |
| 7,235,187 | B2 | 6/2007 | Li et al. |
| 7,290,549 | B2 | 11/2007 | Banerjee et al. |
| 7,303,328 | B2 | 12/2007 | Faraldi et al. |
| 7,335,186 | B2 | 2/2008 | Oneil |
| 7,373,938 | B2 | 5/2008 | Nichols et al. |
| 7,434,584 | B2 | 10/2008 | Steinberg |
| 7,458,374 | B2 | 12/2008 | Hale et al. |
| 7,540,286 | B2 | 6/2009 | Cross et al. |
| 7,581,540 | B2 | 9/2009 | Hale et al. |
| 7,581,718 | B1 | 9/2009 | Chang |
| 7,585,493 | B2 | 9/2009 | Hale et al. |
| 7,645,442 | B2 | 1/2010 | Hale et al. |
| 7,665,461 | B2 | 2/2010 | Zierenberg et al. |
| 7,832,397 | B2 | 11/2010 | Lipowicz |
| 7,834,295 | B2 | 11/2010 | Sharma et al. |
| 7,987,846 | B2 | 8/2011 | Hale et al. |
| 8,156,944 | B2 | 4/2012 | Han |
| 8,342,184 | B2 | 1/2013 | Inagaki et al. |
| 8,365,742 | B2 | 2/2013 | Hon |
| 8,375,957 | B2 | 2/2013 | Hon |
| 8,402,976 | B2 | 3/2013 | Fernando et al. |
| 8,439,046 | B2 | 5/2013 | Peters et al. |
| 8,459,271 | B2 | 6/2013 | Inagaki |
| 8,689,804 | B2 | 4/2014 | Fernando et al. |
| 8,689,805 | B2 | 4/2014 | Hon |
| 8,701,682 | B2 | 4/2014 | Sherwood et al. |
| 8,707,967 | B2 | 4/2014 | Li et al. |
| 9,084,440 | B2 | 7/2015 | Zuber et al. |
| 9,125,437 | B2 | 9/2015 | Kaljura |
| 9,302,522 | B2 | 4/2016 | Sherwood et al. |
| 9,439,454 | B2 | 9/2016 | Fernando et al. |
| 9,668,516 | B2 | 6/2017 | Sherwood et al. |
| 9,955,726 | B2 | 5/2018 | Brinkley et al. |
| 10,130,121 | B2 | 11/2018 | Plojoux et al. |
| 10,130,780 | B2 | 11/2018 | Talon |
| 2001/0042927 | A1 | 11/2001 | Rock |
| 2001/0054421 | A1 | 12/2001 | Jaser et al. |
| 2002/0043260 | A1 | 4/2002 | Layer et al. |
| 2002/0078951 | A1 | 6/2002 | Nichols et al. |
| 2002/0078955 | A1 | 6/2002 | Nichols et al. |
| 2002/0078956 | A1 | 6/2002 | Sharpe et al. |
| 2002/0089072 | A1 | 7/2002 | Rock |
| 2002/0121624 | A1 | 9/2002 | Usui |
| 2003/0007887 | A1 | 1/2003 | Roumpos et al. |
| 2003/0052196 | A1 | 3/2003 | Fuchs |
| 2003/0097164 | A1 | 5/2003 | Stapf et al. |
| 2003/0101984 | A1 | 6/2003 | Li et al. |
| 2003/0105192 | A1 | 6/2003 | Li et al. |
| 2003/0106551 | A1 | 6/2003 | Sprinkel et al. |
| 2003/0111637 | A1 | 6/2003 | Li et al. |
| 2003/0159702 | A1 | 8/2003 | Lindell et al. |
| 2003/0209240 | A1 | 11/2003 | Hale et al. |
| 2003/0217750 | A1 | 11/2003 | Amirpour et al. |
| 2003/0226837 | A1 | 12/2003 | Blake et al. |
| 2003/0230567 | A1 | 12/2003 | Centanni et al. |
| 2004/0031495 | A1 | 2/2004 | Steinberg |
| 2004/0065314 | A1 | 4/2004 | Layer et al. |
| 2004/0068222 | A1 | 4/2004 | Brian |
| 2004/0083755 | A1 | 5/2004 | Kolowich |
| 2004/0149297 | A1 | 8/2004 | Sharpe |
| 2004/0177849 | A1 | 9/2004 | Del |
| 2004/0234699 | A1 | 11/2004 | Hale et al. |
| 2004/0234914 | A1 | 11/2004 | Hale et al. |
| 2004/0234916 | A1 | 11/2004 | Hale et al. |
| 2004/0255941 | A1 | 12/2004 | Nichols et al. |
| 2004/0261782 | A1 | 12/2004 | Furumichi et al. |
| 2005/0007870 | A1 | 1/2005 | Faraldi et al. |
| 2005/0016549 | A1 | 1/2005 | Banerjee et al. |
| 2005/0025213 | A1 | 2/2005 | Parks |
| 2005/0045193 | A1 | 3/2005 | Yang |
| 2005/0063686 | A1 | 3/2005 | Whittle et al. |
| 2005/0079166 | A1 | 4/2005 | Damani et al. |
| 2005/0098187 | A1 | 5/2005 | Grierson et al. |
| 2005/0133029 | A1 | 6/2005 | Nichols et al. |
| 2005/0196345 | A1 | 9/2005 | Diederichs et al. |
| 2005/0236006 | A1 | 10/2005 | Cowan |
| 2006/0027233 | A1 | 2/2006 | Zierenberg et al. |
| 2006/0032501 | A1 | 2/2006 | Hale et al. |
| 2006/0043067 | A1 | 3/2006 | Kadkhodayan et al. |
| 2006/0102175 | A1 | 5/2006 | Nelson |
| 2006/0118128 | A1 | 6/2006 | Hoffmann et al. |
| 2006/0137681 | A1 | 6/2006 | Von et al. |
| 2006/0191546 | A1 | 8/2006 | Takano et al. |
| 2006/0196518 | A1 | 9/2006 | Hon |
| 2006/0196885 | A1 | 9/2006 | Leach et al. |
| 2007/0023043 | A1 | 2/2007 | Von et al. |
| 2007/0028916 | A1 | 2/2007 | Hale et al. |
| 2007/0031340 | A1 | 2/2007 | Hale et al. |
| 2007/0102533 | A1 | 5/2007 | Rosell et al. |
| 2007/0125362 | A1 | 6/2007 | Ford et al. |
| 2007/0131219 | A1 | 6/2007 | Ford et al. |
| 2007/0138207 | A1 | 6/2007 | Bonney et al. |
| 2007/0175476 | A1 | 8/2007 | Lipowicz |
| 2007/0204864 | A1 | 9/2007 | Grychowski et al. |
| 2007/0222112 | A1 | 9/2007 | Christ et al. |
| 2007/0235046 | A1 | 10/2007 | Gedevanishvili |
| 2007/0267407 | A1 | 11/2007 | Loveless et al. |
| 2007/0283972 | A1 | 12/2007 | Monsees et al. |
| 2007/0289720 | A1 | 12/2007 | Sunol et al. |
| 2008/0027694 | A1 | 1/2008 | Gitman |
| 2008/0031267 | A1 | 2/2008 | Imao |
| 2008/0038363 | A1 | 2/2008 | Zaffaroni et al. |
| 2008/0149118 | A1 | 6/2008 | Oglesby et al. |
| 2008/0156326 | A1 | 7/2008 | Belcastro et al. |
| 2008/0216828 | A1 | 9/2008 | Wensley et al. |
| 2008/0241255 | A1 | 10/2008 | Rose et al. |
| 2008/0257367 | A1 | 10/2008 | Paterno et al. |
| 2008/0276947 | A1 | 11/2008 | Martzel |
| 2008/0312674 | A1 | 12/2008 | Chen et al. |
| 2009/0015717 | A1 | 1/2009 | Arnao et al. |
| 2009/0071477 | A1 | 3/2009 | Hale et al. |
| 2009/0078711 | A1 | 3/2009 | Farone et al. |
| 2009/0090349 | A1 | 4/2009 | Donovan |
| 2009/0090351 | A1 | 4/2009 | Sunol et al. |
| 2009/0095287 | A1 | 4/2009 | Emarlou |
| 2009/0107492 | A1 | 4/2009 | Ooida |
| 2009/0114215 | A1 | 5/2009 | Spallek et al. |
| 2009/0127253 | A1 | 5/2009 | Stark et al. |
| 2009/0151717 | A1 | 6/2009 | Bowen et al. |
| 2009/0162294 | A1 | 6/2009 | Werner |
| 2009/0180968 | A1 | 7/2009 | Hale et al. |
| 2009/0199843 | A1 | 8/2009 | Farone et al. |
| 2009/0217923 | A1 | 9/2009 | Boehm et al. |

(56) References Cited

U.S. PATENT DOCUMENTS

2009/0230117 A1 9/2009 Fernando et al.
2009/0255923 A1 10/2009 Buehrer et al.
2009/0260641 A1 10/2009 Monsees et al.
2009/0260642 A1 10/2009 Monsees et al.
2009/0280043 A1 11/2009 Ferguson
2009/0301363 A1 12/2009 Damani et al.
2009/0301471 A1 12/2009 Stirzel
2009/0302019 A1 12/2009 Selenski et al.
2010/0006092 A1 1/2010 Hale et al.
2010/0025023 A1 2/2010 Schmidt et al.
2010/0031968 A1 2/2010 Sheikh et al.
2010/0043809 A1 2/2010 Magnon
2010/0065052 A1 3/2010 Sharma et al.
2010/0068154 A1 3/2010 Sharma et al.
2010/0089381 A1 4/2010 Bolmer et al.
2010/0181387 A1 7/2010 Zaffaroni et al.
2010/0236546 A1 9/2010 Yamada et al.
2010/0242974 A1 9/2010 Pan
2010/0258585 A1 10/2010 Jamison
2010/0268212 A1 10/2010 Manwaring et al.
2010/0300467 A1 12/2010 Kuistila et al.
2010/0307518 A1 12/2010 Wang
2010/0313901 A1 12/2010 Stahle et al.
2011/0005535 A1 1/2011 Xiu
2011/0030671 A1 2/2011 Ferguson et al.
2011/0192408 A1 8/2011 Inagaki et al.
2011/0240022 A1 10/2011 Hodges et al.
2011/0283458 A1 11/2011 Gillette et al.
2011/0290266 A1 12/2011 Koeller
2011/0303230 A1 12/2011 Thiry
2012/0006342 A1 1/2012 Rose et al.
2012/0006343 A1 1/2012 Renaud et al.
2012/0145189 A1 6/2012 Knopow et al.
2012/0234315 A1 9/2012 Li et al.
2013/0061861 A1 3/2013 Hearn
2013/0133675 A1 5/2013 Shinozaki et al.
2013/0152922 A1 6/2013 Benassayag et al.
2014/0196716 A1 7/2014 Liu
2014/0216482 A1 8/2014 Dotan et al.
2014/0238737 A1 8/2014 Backman
2015/0245669 A1 9/2015 Cadieux et al.
2015/0272219 A1 10/2015 Hatrick et al.
2015/0282256 A1 10/2015 Iguro et al.
2015/0302971 A1 10/2015 Wagman et al.
2015/0320116 A1 11/2015 Bleloch et al.
2016/0044963 A1 2/2016 Saleem
2016/0150825 A1 6/2016 Mironov et al.
2016/0150828 A1 6/2016 Goldstein et al.
2017/0055574 A1 3/2017 Kaufman et al.
2017/0055575 A1 3/2017 Wilke et al.
2017/0055580 A1 3/2017 Blandino et al.
2017/0055581 A1 3/2017 Wilke et al.
2017/0055582 A1 3/2017 Blandino et al.
2017/0055583 A1 3/2017 Blandino et al.
2017/0055584 A1 3/2017 Blandino et al.
2017/0071250 A1 3/2017 Mironov et al.
2017/0079325 A1 3/2017 Mironov
2017/0119046 A1 5/2017 Kaufman et al.
2017/0119047 A1 5/2017 Blandino et al.
2017/0119048 A1 5/2017 Kaufman et al.
2017/0119049 A1 5/2017 Blandino et al.
2017/0119050 A1 5/2017 Blandino et al.
2017/0119051 A1 5/2017 Blandino et al.
2017/0119054 A1 5/2017 Zinovik et al.
2017/0156403 A1 6/2017 Gill et al.
2018/0235279 A1 8/2018 Wilke et al.
2018/0242633 A1 8/2018 Wilke et al.
2018/0242636 A1 8/2018 Blandino et al.
2018/0249760 A1 9/2018 Kaufman et al.
2018/0279677 A1 10/2018 Blandino et al.
2018/0317286 A1* 11/2018 Rojo-Calderon ...... H05B 6/106
2018/0317552 A1 11/2018 Kaufman et al.
2018/0317554 A1 11/2018 Kaufman et al.
2018/0317555 A1 11/2018 Blandino et al.
2018/0325173 A1 11/2018 Blandino et al.
2019/0082738 A1 3/2019 Blandino et al.
2019/0191780 A1 6/2019 Wilke et al.
2019/0239555 A1 8/2019 Nicholson
2019/0313695 A1 10/2019 Kaufman et al.
2019/0364973 A1 12/2019 Kaufman et al.
2020/0054068 A1 2/2020 Blandino et al.
2020/0054069 A1 2/2020 Blandino et al.

FOREIGN PATENT DOCUMENTS

AT 321190 B 3/1975
AT 321191 B 3/1975
AU 2002364521 A1 6/2003
AU 2016344645 B2 7/2019
CA 2160990 A1 10/1994
CA 2146954 A1 10/1996
CA 2414161 A1 1/2002
CA 2414191 A1 1/2002
CA 2520759 A1 10/2004
CA 2492255 A1 7/2006
CA 2668465 A1 12/2009
CA 2641869 A1 5/2010
CA 2862048 A1 7/2013
CA 2923377 A1 6/2015
CH 513656 A 10/1971
CH 698603 B1 9/2009
CL 2017003408 A1 6/2018
CN 1038085 A 12/1989
CN 1043076 A 6/1990
CN 1045691 A 10/1990
CN 1059649 A 3/1992
CN 1121385 A 4/1996
CN 1123000 A 5/1996
CN 1123001 A 5/1996
CN 1126425 A 7/1996
CN 1126426 A 7/1996
CN 1158757 A 9/1997
CN 1209731 A 3/1999
CN 1287890 A 3/2001
CN 1293591 A 5/2001
CN 1293596 A 5/2001
CN 1151739 C 6/2004
CN 1575135 A 2/2005
CN 201076006 Y 6/2008
CN 101277622 A 10/2008
CN 101390659 A 3/2009
CN 201199922 Y 3/2009
CN 201375023 Y 1/2010
CN 201445686 U 5/2010
CN 102212340 A 10/2011
CN 102499466 A 6/2012
CN 202351223 U 7/2012
CN 203369386 U 1/2014
CN 103689812 A 4/2014
CN 203762288 U 8/2014
CN 104095291 A 10/2014
CN 104095295 A 10/2014
CN 104203016 A 12/2014
CN 104223359 A 12/2014
CN 104256899 A 1/2015
CN 204091003 U 1/2015
CN 104619202 A 5/2015
CN 204519364 U 8/2015
CN 204519365 U 8/2015
CN 104957779 A 10/2015
CN 104997164 A 10/2015
CN 204949521 U 1/2016
DE 360431 C 10/1922
DE 1100884 B 3/1961
DE 1425872 A1 11/1968
DE 1290499 B 3/1969
DE 1813993 A1 6/1970
DE 1425871 B1 10/1970
DE 2315789 A1 10/1973
DE 4105370 A1 8/1992
DE 4307144 C2 1/1995
DE 4343578 A1 6/1995
DE 29509286 U1 8/1995
DE 4420366 A1 12/1995

(56) References Cited

FOREIGN PATENT DOCUMENTS

| | | | |
|---|---|---|---|
| DE | 29700307 | U1 | 4/1997 |
| DE | 19854007 | A1 | 5/2000 |
| DE | 19854009 | A1 | 5/2000 |
| DE | 10058642 | A1 | 6/2001 |
| DE | 10007521 | A1 | 8/2001 |
| DE | 10064288 | A1 | 8/2001 |
| DE | 10164587 | A1 | 7/2003 |
| DE | 102005024803 | A1 | 6/2006 |
| DE | 202006013439 | U1 | 10/2006 |
| DE | 102005056885 | A1 | 5/2007 |
| DE | 102006041544 | A1 | 8/2007 |
| DE | 102006041042 | A1 | 3/2008 |
| DE | 102006047146 | A1 | 4/2008 |
| DE | 102007011120 | A1 | 9/2008 |
| DE | 102008034509 | A1 | 4/2009 |
| DE | 102008013303 | A1 | 9/2009 |
| DE | 202009010400 | U1 | 11/2009 |
| DE | 102008038121 | A1 | 2/2010 |
| DE | 202010011436 | U1 | 11/2010 |
| DK | 114399 | B | 6/1969 |
| DK | 488488 | A | 3/1989 |
| DK | 0540774 | T3 | 7/1995 |
| DK | 0540775 | T3 | 8/1997 |
| EP | 0033668 | A1 | 8/1981 |
| EP | 0076897 | A1 | 4/1983 |
| EP | 0033668 | B1 | 6/1983 |
| EP | 0149997 | A2 | 7/1985 |
| EP | 0194257 | A1 | 9/1986 |
| EP | 0371285 | A2 | 6/1990 |
| EP | 0418464 | A2 | 3/1991 |
| EP | 0430559 | A2 | 6/1991 |
| EP | 0430566 | A2 | 6/1991 |
| EP | 0503767 | A1 | 9/1992 |
| EP | 0520231 | A2 | 12/1992 |
| EP | 0703735 | A1 | 4/1996 |
| EP | 0354661 | B1 | 4/1997 |
| EP | 0540775 | B1 | 7/1997 |
| EP | 0824927 | A2 | 2/1998 |
| EP | 0653218 | B1 | 9/1998 |
| EP | 1064083 | A2 | 1/2001 |
| EP | 1064101 | A2 | 1/2001 |
| EP | 1111191 | A2 | 6/2001 |
| EP | 0703735 | B1 | 7/2001 |
| EP | 1128741 | A1 | 9/2001 |
| EP | 1128742 | A1 | 9/2001 |
| EP | 1148905 | A2 | 10/2001 |
| EP | 1203189 | A1 | 5/2002 |
| EP | 1217320 | A2 | 6/2002 |
| EP | 1298993 | A1 | 4/2003 |
| EP | 1299499 | A1 | 4/2003 |
| EP | 1299500 | A2 | 4/2003 |
| EP | 1301152 | A2 | 4/2003 |
| EP | 1349601 | A2 | 10/2003 |
| EP | 1357025 | A2 | 10/2003 |
| EP | 1390112 | A1 | 2/2004 |
| EP | 1409051 | A2 | 4/2004 |
| EP | 1439876 | A2 | 7/2004 |
| EP | 1454840 | A1 | 9/2004 |
| EP | 1490452 | A2 | 12/2004 |
| EP | 1506792 | A2 | 2/2005 |
| EP | 1609376 | A1 | 12/2005 |
| EP | 1625334 | A2 | 2/2006 |
| EP | 1625335 | A2 | 2/2006 |
| EP | 1625336 | A2 | 2/2006 |
| EP | 1454840 | B1 | 9/2006 |
| EP | 1536703 | B1 | 9/2006 |
| EP | 1702639 | A2 | 9/2006 |
| EP | 1749548 | A2 | 2/2007 |
| EP | 1867357 | A1 | 12/2007 |
| EP | 1891867 | A2 | 2/2008 |
| EP | 1940254 | A2 | 7/2008 |
| EP | 1996880 | A2 | 12/2008 |
| EP | 2044967 | A1 | 4/2009 |
| EP | 1357025 | B1 | 7/2009 |
| EP | 2083642 | A1 | 8/2009 |
| EP | 2138058 | A1 | 12/2009 |
| EP | 2138059 | A1 | 12/2009 |
| EP | 2179229 | A2 | 4/2010 |
| EP | 2191735 | A1 | 6/2010 |
| EP | 2227973 | A1 | 9/2010 |
| EP | 2234508 | A2 | 10/2010 |
| EP | 2241203 | A2 | 10/2010 |
| EP | 2138057 | B1 | 11/2010 |
| EP | 2246086 | A2 | 11/2010 |
| EP | 2249669 | A1 | 11/2010 |
| EP | 2253541 | A1 | 11/2010 |
| EP | 2257195 | A1 | 12/2010 |
| EP | 2277398 | A1 | 1/2011 |
| EP | 2303043 | A2 | 4/2011 |
| EP | 2316286 | A1 | 5/2011 |
| EP | 2327318 | A1 | 6/2011 |
| EP | 2368449 | A1 | 9/2011 |
| EP | 2003997 | B1 | 10/2011 |
| EP | 2408494 | A1 | 1/2012 |
| EP | 2444112 | A1 | 4/2012 |
| EP | 2253541 | B1 | 5/2012 |
| EP | 2523752 | A1 | 11/2012 |
| EP | 2542131 | A2 | 1/2013 |
| EP | 2760303 | A2 | 8/2014 |
| EP | 2907397 | A1 | 8/2015 |
| ES | 262308 | U | 6/1982 |
| FR | 718708 | A | 1/1932 |
| FR | 1418189 | A | 11/1965 |
| FR | 2573985 | A1 | 6/1986 |
| FR | 2604093 | A1 | 3/1988 |
| FR | 2700697 | A1 | 7/1994 |
| FR | 2730166 | A1 | 8/1996 |
| FR | 2818152 | A1 | 6/2002 |
| FR | 2842791 | B1 | 4/2005 |
| FR | 2873584 | B1 | 11/2006 |
| GB | 347650 | A | 4/1931 |
| GB | 353745 | A | 7/1931 |
| GB | 910166 | A | 11/1962 |
| GB | 922310 | A | 3/1963 |
| GB | 958867 | A | 5/1964 |
| GB | 1104214 | A | 2/1968 |
| GB | 1227333 | A | 4/1971 |
| GB | 1379688 | A | 1/1975 |
| GB | 1431334 | A | 4/1976 |
| GB | 2294401 | A | 5/1996 |
| GB | 2323033 | A | 9/1998 |
| GB | 2342874 | A | 4/2000 |
| GB | 2388040 | A | 11/2003 |
| GB | 2412326 | A | 9/2005 |
| GB | 2412876 | A | 10/2005 |
| GB | 2448478 | A | 10/2008 |
| GB | 2487851 | A | 8/2012 |
| GB | 2495923 | A | 5/2013 |
| GB | 2504732 | A | 2/2014 |
| IE | 63083 | B1 | 3/1995 |
| IT | 1289590 | B1 | 10/1998 |
| JP | S4961986 | A | 6/1974 |
| JP | S5096908 | A | 8/1975 |
| JP | S5594260 | A | 7/1980 |
| JP | S57110260 | A | 7/1982 |
| JP | S57177769 | A | 11/1982 |
| JP | S63153666 | A | 6/1988 |
| JP | H01191674 | A | 8/1989 |
| JP | H01166953 | U | 11/1989 |
| JP | H0292986 | A | 4/1990 |
| JP | H034479 | A | 1/1991 |
| JP | H03232481 | A | 10/1991 |
| JP | H0851175 | A | 2/1996 |
| JP | 2519658 | B2 | 7/1996 |
| JP | H08228751 | A | 9/1996 |
| JP | H08511175 | A | 11/1996 |
| JP | 3053426 | U | 10/1998 |
| JP | H11503912 | A | 4/1999 |
| JP | H11507234 | A | 6/1999 |
| JP | H11178562 | A | 7/1999 |
| JP | 3016586 | B2 | 3/2000 |
| JP | 2000082576 | A | 3/2000 |
| JP | 2000093155 | A | 4/2000 |
| JP | 3078033 | B2 | 8/2000 |

(56) References Cited

FOREIGN PATENT DOCUMENTS

| | | | |
|---|---|---|---|
| JP | 2000515576 | A | 11/2000 |
| JP | 3118462 | B2 | 12/2000 |
| JP | 3118463 | B2 | 12/2000 |
| JP | 2002170657 | A | 6/2002 |
| JP | 2002253593 | A | 9/2002 |
| JP | 2002336290 | A | 11/2002 |
| JP | 2003034785 | A | 2/2003 |
| JP | 3392138 | B2 | 3/2003 |
| JP | 2004504580 | A | 2/2004 |
| JP | 3588469 | B2 | 11/2004 |
| JP | 2005050624 | A | 2/2005 |
| JP | 2005516647 | A | 6/2005 |
| JP | 2006524494 | A | 11/2006 |
| JP | 2007516015 | A | 6/2007 |
| JP | 2007522900 | A | 8/2007 |
| JP | 2008509907 | A | 4/2008 |
| JP | 2008511175 | A | 4/2008 |
| JP | 2009509523 | A | 3/2009 |
| JP | 2010041354 | A | 2/2010 |
| JP | 2010526553 | A | 8/2010 |
| JP | 2011135901 | A | 7/2011 |
| JP | 2012529936 | A | 11/2012 |
| JP | 2014526275 | A | 10/2014 |
| JP | 2015503336 | A | 2/2015 |
| JP | 2015503337 | A | 2/2015 |
| JP | 2015060837 | A | 3/2015 |
| JP | 2015506170 | A | 3/2015 |
| JP | 2015508287 | A | 3/2015 |
| JP | 2015509706 | A | 4/2015 |
| JP | 2015098645 | A | 5/2015 |
| JP | 2015531601 | A | 11/2015 |
| JP | 2016036222 | A | 3/2016 |
| JP | 2016525341 | A | 8/2016 |
| JP | 2017515490 | A | 6/2017 |
| JP | 2017520234 | A | 7/2017 |
| JP | 2017526381 | A | 9/2017 |
| JP | 2018520664 | A | 8/2018 |
| JP | 2019501633 | A | 1/2019 |
| JP | 2020067569 | A | 4/2020 |
| JP | 2020067596 | A | 4/2020 |
| JP | 2020115877 | A | 8/2020 |
| JP | 2021019640 | A | 2/2021 |
| KR | 960702734 | A | 5/1996 |
| KR | 100385395 | B1 | 8/2003 |
| KR | 20040068292 | A | 7/2004 |
| KR | 20070096027 | A | 10/2007 |
| KR | 100971178 | B1 | 7/2010 |
| KR | 20120104533 | A | 9/2012 |
| KR | 20130029697 | A | 3/2013 |
| KR | 20140068808 | A | 6/2014 |
| KR | 20140123487 | A | 10/2014 |
| KR | 102061674 | B1 | 12/2019 |
| RU | 2102906 | C1 | 1/1998 |
| RU | 94815 | U1 | 6/2010 |
| RU | 2015105675 | A | 8/2015 |
| RU | 2013155697 | A | 10/2015 |
| RU | 2687757 | C1 | 5/2019 |
| SE | 7415242 | L | 6/1975 |
| SE | 0502503 | L | 10/2006 |
| TW | 274507 | B | 4/1996 |
| TW | 201325481 | A | 7/2013 |
| WO | 8404698 | A1 | 12/1984 |
| WO | 8601730 | A1 | 3/1986 |
| WO | 9013326 | A1 | 11/1990 |
| WO | 9409842 | A1 | 5/1994 |
| WO | 9527411 | A1 | 10/1995 |
| WO | 9639880 | A1 | 12/1996 |
| WO | 9805906 | A1 | 2/1998 |
| WO | 9823171 | A1 | 6/1998 |
| WO | 9835552 | A1 | 8/1998 |
| WO | 9914402 | A1 | 3/1999 |
| WO | 9947273 | A2 | 9/1999 |
| WO | 9947806 | A2 | 9/1999 |
| WO | 0028843 | A1 | 5/2000 |
| WO | 0104548 | A1 | 1/2001 |
| WO | 0140717 | A1 | 6/2001 |
| WO | 0163183 | A1 | 8/2001 |
| WO | 0205620 | A2 | 1/2002 |
| WO | 0205640 | A1 | 1/2002 |
| WO | 0206421 | A1 | 1/2002 |
| WO | 0207656 | A2 | 1/2002 |
| WO | 0224262 | A2 | 3/2002 |
| WO | 02051466 | A2 | 7/2002 |
| WO | 02096532 | A1 | 12/2002 |
| WO | 02098389 | A1 | 12/2002 |
| WO | 03037412 | A2 | 5/2003 |
| WO | 03049792 | A1 | 6/2003 |
| WO | 03083007 | A2 | 10/2003 |
| WO | 2004098324 | A2 | 11/2004 |
| WO | 2004104491 | A2 | 12/2004 |
| WO | 2004104492 | A2 | 12/2004 |
| WO | 2004104493 | A2 | 12/2004 |
| WO | 2006022714 | A1 | 3/2006 |
| WO | 2007042941 | A2 | 4/2007 |
| WO | 2007051163 | A2 | 5/2007 |
| WO | 2007054167 | A1 | 5/2007 |
| WO | 2007078273 | A1 | 7/2007 |
| WO | 2007090594 | A1 | 8/2007 |
| WO | 2007098337 | A2 | 8/2007 |
| WO | 2007116915 | A1 | 10/2007 |
| WO | 2008015441 | A1 | 2/2008 |
| WO | 2008029381 | A2 | 3/2008 |
| WO | 2008051909 | A1 | 5/2008 |
| WO | 2008069883 | A1 | 6/2008 |
| WO | 2008151777 | A2 | 12/2008 |
| WO | 2009006521 | A2 | 1/2009 |
| WO | 2009042955 | A2 | 4/2009 |
| WO | 2009079641 | A2 | 6/2009 |
| WO | 2009092862 | A1 | 7/2009 |
| WO | 2009118085 | A1 | 10/2009 |
| WO | 2009152651 | A1 | 12/2009 |
| WO | 2009155957 | A1 | 12/2009 |
| WO | 2009156181 | A2 | 12/2009 |
| WO | 2010017586 | A1 | 2/2010 |
| WO | 2010047389 | A1 | 4/2010 |
| WO | 2010053467 | A1 | 5/2010 |
| WO | 2010060537 | A1 | 6/2010 |
| WO | 2010107613 | A1 | 9/2010 |
| WO | 2011088132 | A1 | 7/2011 |
| WO | 2011101164 | A1 | 8/2011 |
| WO | 2011109304 | A2 | 9/2011 |
| WO | 2011117580 | A2 | 9/2011 |
| WO | 2012054973 | A1 | 5/2012 |
| WO | 2012072770 | A1 | 6/2012 |
| WO | 2012072790 | A1 | 6/2012 |
| WO | 2012078865 | A2 | 6/2012 |
| WO | 2012100430 | A1 | 8/2012 |
| WO | 2013034455 | A1 | 3/2013 |
| WO | 2013034458 | A1 | 3/2013 |
| WO | 2013076098 | A2 | 5/2013 |
| WO | 2013098395 | A1 | 7/2013 |
| WO | 2013098405 | A2 | 7/2013 |
| WO | 2013098409 | A1 | 7/2013 |
| WO | 2013098410 | A2 | 7/2013 |
| WO | 2013102609 | A2 | 7/2013 |
| WO | 2014023965 | A1 | 2/2014 |
| WO | 2014048745 | A1 | 4/2014 |
| WO | 2015051646 | A1 | 4/2015 |
| WO | 2015068936 | A1 | 5/2015 |
| WO | 2015082648 | A1 | 6/2015 |
| WO | 2015131058 | A1 | 9/2015 |
| WO | 2015177045 | A1 | 11/2015 |
| WO | 2015177255 | A1 | 11/2015 |
| WO | 2015177263 | A1 | 11/2015 |
| WO | 2015177264 | A1 | 11/2015 |
| WO | 2015177265 | A1 | 11/2015 |
| WO | 2015177294 | A1 | 11/2015 |
| WO | 2015198015 | A1 | 12/2015 |
| WO | 2016014652 | A1 | 1/2016 |
| WO | 2016200815 | A2 | 12/2016 |
| WO | 2017001819 | A1 | 1/2017 |
| WO | 2017005705 | A1 | 1/2017 |

(56) References Cited

FOREIGN PATENT DOCUMENTS

WO 2017029270 A1 2/2017
WO 2017068099 A1 4/2017

OTHER PUBLICATIONS

Blandino, et al., Application and File History for U.S. Appl. No. 14/840,652, filed Aug. 31, 2015.
Blandino, et al., Application and File History for U.S. Appl. No. 14/840,731, filed, Aug. 31, 2015.
Blandino, et al., Application and File History for U.S. Appl. No. 14/840,751, filed Aug. 31, 2015.
Blandino, et al., Application and File History for U.S. Appl. No. 14/840,854, filed Aug. 31, 2015.
Blandino, et al., Application and File History for U.S. Appl. No. 14/927,539, filed Oct. 30, 2015.
Blandino, et al., Application and File History for U.S. Appl. No. 14/927,551, filed Oct. 30, 2015.
Blandino, et al., Application and File History for U.S. Appl. No. 14/927,556, filed Oct. 30, 2015.
Blandino, et al., Application and File History for U.S. Appl. No. 15/754,801, filed Feb. 23, 2018.
Blandino, et al., Application and File History for U.S. Appl. No. 15/754,812, filed Feb. 23, 2018.
Blandino, et al., Application and File History for U.S. Appl. No. 15/754,818, filed Feb. 23, 2018.
Blandino, et al., Application and File History for U.S. Appl. No. 15/754,823, filed Feb. 23, 2018.
Chaplin, Hydrocolloids and Gums, retrieved from: <http://www1.lsbu.ac.uk/water/hydrocolloids_gums.html> , Established in 2001, 7 pages.
Egzoset, Induction vaporizer (based on "Curie" alloys), Fuck Combustion forum, Available at <https://fuckcombustion.com/threads/induction-vaporizer-based-on-curiealloys.4598/>, Nov. 13, 2011, 7 pages.
Extended European Search Report received for European Patent Application No. 19164405.3, mailed on Aug. 28, 2019, 6 pages.
Extended European Search Report received for European Patent Application No. 19165045.6 mailed on Sep. 6, 2019, 7 pages.
Extended European Search Report received for European Patent Application No. 19216472.1 mailed on Apr. 22, 2020, 13 pages.
First Office Action filed Apr. 11, 2011 received for Chinese Application No. 201380021387.2, mailed on Dec. 3, 2015, 18 pages.
Gaohe, Chinese Scientific Information, vol. 10, May 15, 2010, pp. 132-133.
Hatrick, et al., Application and File History for U.S. Appl. No. 14/428,626, filed Mar. 16, 2015.
Ineos, Typical Engineering Properties of High Density Polyethylene, Olefins and Polymers, USA, retrieved from https://www.ineos.com/globalassets/ineos-group/businesses/ineos-olefins-and-polymers-USA/products/technical-information--patents/ineos-typical-engineering-properties-of-hdpe.pdf, Accessed Dec. 4, 2018, 2 pages.
International Preliminary Report on Patentability for Application No. PCT/EP2013/068797, issued on Mar. 31, 2015, 5 pages.
International Preliminary Report on Patentability for Application No. PCT/EP2016/070176, mailed on Mar. 15, 2018, 12 pages.
International Preliminary Report on Patentability for Application No. PCT/EP2016/070178, mailed on Mar. 15, 2018, 8 pages.
International Preliminary Report on Patentability for Application No. PCT/EP2016/070182, mailed on Mar. 15, 2018, 8 pages.
International Preliminary Report on Patentability for Application No. PCT/EP2016/070185, mailed on Mar. 15, 2018, 11 pages.
International Preliminary Report on Patentability for Application No. PCT/EP2016/070188, mailed on Mar. 15, 2018, 8 pages.
International Preliminary Report on Patentability for Application No. PCT/EP2016/070191, mailed on Mar. 15, 2018, 8 pages.
International Preliminary Report on Patentability for Application No. PCT/EP2016/075734, mailed on May 11, 2018, 7 pages.
International Preliminary Report on Patentability for Application No. PCT/EP2016/075739, completed on Jan. 16, 2018, 7 pages.
International Preliminary Report on Patentability for Application No. PCT/GB2013/052433, issued on Mar. 24, 2015, 9 pages.
International Search Report and Written Opinion for Application No. PCT/EP2013/068797, mailed on Dec. 9, 2013, 8 pages.
International Search Report and Written Opinion for Application No. PCT/EP2016/070176, mailed Apr. 19, 2017, 21 Pages.
International Search Report and Written Opinion for Application No. PCT/EP2016/070178, mailed Dec. 14, 2016, 10 pages.
International Search Report and Written Opinion for Application No. PCT/EP2016/070182, mailed on Dec. 12, 2016, 11 pages.
International Search Report and Written Opinion for Application No. PCT/EP2016/070185, mailed on Apr. 4, 2017, 16 pages.
International Search Report and Written Opinion for Application No. PCT/EP2016/070188, mailed on Dec. 13, 2016, 10 pages.
International Search Report and Written Opinion for Application No. PCT/EP2016/070191, mailed on Dec. 13, 2016, 10 pages.
International Search Report and Written Opinion for Application No. PCT/GB2013/052433, mailed on Jun. 30, 2014, 16 pages.
International Search Report and Written Opinion received for PCT Patent Application No. PCT/EP2016/075734, mailed on Apr. 6, 2017, 12 pages.
International Search Report and Written Opinion, received for PCT Application No. PCT/EP2016/075739, mailed Feb. 24, 2017, 10 pages.
Iorga, et al., Low Curie Temperature in Fe—Cr—Ni—Mn Alloys, U.P.B. Sci.Bull., Series B, vol. 73, Iss.4, 2011, pp. 195-202.
Japanese Office Action, Application No. 2018-521547, dated Jun. 25, 2019, 4 pages.
jrank.org, Heat Capacity and Calorimetry, Heat Capacity and the Law of Conservation of Energy—Significance of the High Heat Capacity of Water, retrieved from https://science.jrank.org/pages/3265/Heat-Capacity.html, Accessed on Jun. 15, 2017, 2 pages.
Kaufman, et al., Application and File History for U.S. Appl. No. 14/927,529, filed Oct. 30, 2015.
Kaufman, et al., Application and File History for U.S. Appl. No. 14/927,537, filed Oct. 30, 2015.
Kaufman, et al., Application and File History for U.S. Appl. No. 15/772,382, filed Apr. 30, 2018.
Office Action and Search Report filed Aug. 26, 2016 for Chinese Application No. 2016800498156, mailed on May 6, 2020, 7 pages.
Office Action and Search Report filed Aug. 29, 2016 for Taiwan Application No. 105127626, mailed on Feb. 25, 2020, 14 pages.
Office Action mailed Dec. 3, 2019 for Japanese Application No. 2018-506381, 16 pages.
Office Action received for Canadian Patent Application No. 2995315, mailed on Feb. 19, 2019, 4 pages.
Office Action received for Canadian Patent Application No. 2996835, mailed on Feb. 14, 2019, 3 pages.
Office Action received for Canadian Patent Application No. 3003514, mailed on Mar. 28, 2019, 6 pages.
Office Action received for Chinese Patent Application No. 201380048636.7, mailed on May 5, 2016, 25 pages.
Office Action received for Chinese Patent Application No. 201680049679.0, mailed on Nov. 4, 2019, 22 pages.
Office Action received for Chinese Patent Application No. 2016800498156, mailed on Oct. 21, 2019, 20 pages.
Office Action received for Chinese Patent Application No. 2016800498584, mailed on Nov. 1, 2019, 6 pages.
Office Action received for Japanese Application No. 2018-506553, mailed on Mar. 19, 2019, 8 pages.
Office Action received for Japanese Application No. 2018-506575, mailed on Mar. 19, 2019, 10 pages.
Office Action received for Japanese Patent Application No. 2017-075527, mailed on Jan. 8, 2019, 15 pages.
Office Action received for Japanese Patent Application No. 2017-075527, mailed on Mar. 13, 2018, 10 pages.
Office Action received for Japanese Patent Application No. 2018-506381, mailed on Mar. 26, 2019, 22 pages.
Office Action received for Japanese Patent Application No. 2018-506553, mailed on Nov. 5, 2019, 12 pages.

(56) References Cited

OTHER PUBLICATIONS

Office Action received for Japanese Patent Application No. 2018-506563, mailed on May 7, 2019, 4 pages.
Office Action received for Japanese Patent Application No. 2018-506565, mailed Nov. 5, 2019, 12 pages.
Office Action received for Japanese Patent Application No. 2018-506575, mailed on Nov. 12, 2019, 8 pages.
Office Action received for Japanese Patent Application No. 2018-507624, mailed on Feb. 13, 2019, 32 pages.
Office Action received for Japanese Patent Application No. 2018-507624, mailed on Oct. 29, 2019, 29 Pages.
Office Action received for Japanese Patent Application No. 2018-521547, mailed on Dec. 3, 2019, 4 pages.
Office Action received for Japanese Patent Application No. 2018-519865, mailed on Jun. 25, 2019, 3 pages.
Office Action received for Japanese Patent Application No. 2018-506565, mailed on Mar. 19, 2019, 8 pages.
Office Action received for Korean Patent Application No. 10-2018-7006009, mailed on Aug. 29, 2019, 9 pages.
Office Action received for Korean Patent Application No. 10-2018-7006009, mailed on Jan. 31, 2019, 17 pages.
Office Action received for Korean Patent Application No. 10-2018-7006070, mailed on Feb. 7, 2019, 17 pages.
Office Action received for Korean Patent Application No. 10-2018-7006077, mailed on Feb. 8, 2019, 15 pages.
Office Action received for Russian Patent Application No. 2015106592, mailed on Sep. 13, 2017, 6 pages.
Office Action received for Taiwan Patent Application No. 105127627, mailed on Dec. 19, 2019, 14 pages.
Rasidek, et al., Effect of Temperature on Rheology Behaviour of Banana Peel Pectin Extracted Using Hot Compressed Water, Jurnal Teknologi (Sciences & Engineering), vol. 80, No. 3, Apr. 1, 2018, pp. 97-103.
Reasons for Refusal Received for Japanese Patent Application No. 2015-531544, mailed on Feb. 1, 2016, 5 pages.
Scientific Principles, University of Illinois, retrieved from: <http://matse1.matse.illinois.edu/ceramics/prin.html>, Jun. 15, 2017, 13 pages.
Search Report received for Great Britain Patent Application No. 1216621.1, mailed on Jan. 17, 2013, 6 pages.
Second Office Action received for Chinese Patent Application No. 201380048636.7, mailed on Jan. 16, 2017, 23 pages.
Temperature-Sensitive Magnetic Alloys, NeoMax Materials Co. Ltd., Available Online at <http://www.neomax-materials.co.jp/eng/pr0510.htm>, Oct. 30, 2015, 2 pages.
The Engineering Toolbox, Specific Heats for Metals, retrieved from https://www.engineeringtoolbox.com/specific-heat-metals-d_ 152.html, 2003, 6 pages.
Todaka, et al., Low Curie Temperature Material for Induction Heating Self-Temperature Controlling System, Journal of Magnetism and Magnetic Materials 320, 2008, pp. e702-e707.
Wilke, et al., Application and File History for U.S. Appl. No. 14/840,703, filed Aug. 31, 2015.
Wilke, et al., Application and File History for U.S. Appl. No. 14/840,972, filed Aug. 31, 2015.
Wilke, et al., Application and File History for U.S. Appl. No. 15/754,809, filed Feb. 23, 2018.
Wilke, et al., Application and File History for U.S. Appl. No. 15/754,837, filed Feb. 23, 2018.
Notification of Reasons for Refusal issued in Japanese Application No. 2022-107307 on Nov. 21, 2023, all enclosed pages cited.

* cited by examiner

ARTICLE FOR USE WITH APPARATUS FOR HEATING SMOKABLE MATERIAL

PRIORITY CLAIM

The present application is a Continuation Application of U.S. patent application Ser. No. 17/187,077, filed Feb. 26, 2021, which is a Continuation Application of U.S. patent application Ser. No. 15/772,386, filed Apr. 30, 2018, which is a National Phase entry of PCT Application No. PCT/EP2016/075739, filed Oct. 26, 2016, which claims priority from U.S. patent application Ser. No. 14/927,532, filed Oct. 30, 2015, each of which is hereby fully incorporated herein by reference.

TECHNICAL FIELD

The present disclosure relates to apparatus for heating smokable material to volatilize at least one component of the smokable material, to articles for use with such apparatus, to systems comprising such apparatus and such articles, and to methods of manufacturing products comprising heaters for use in heating smokable material to volatilize at least one component of the smokable material.

BACKGROUND

Smoking articles such as cigarettes, cigars and the like burn tobacco during use to create tobacco smoke. Attempts have been made to provide alternatives to these articles by creating products that release compounds without combusting. Examples of such products are so-called “heat not burn” products or tobacco heating devices or products, which release compounds by heating, but not burning, material. The material may be, for example, tobacco or other non-tobacco products, which may or may not contain nicotine.

SUMMARY

A first aspect of the present disclosure provides a method of manufacturing a product comprising a heater for use in heating smokable material to volatilize at least one component of the smokable material, the method comprising: determining a maximum temperature to which a heater is to be heated in use; and providing a heater comprising heating material, wherein the heating material is heatable by penetration with a varying magnetic field, and wherein the heating material has a Curie point temperature selected on the basis of the determined maximum temperature.

In an exemplary embodiment, the Curie point temperature is equal to or less than the maximum temperature.

In an exemplary embodiment, the maximum temperature is less than the combustion temperature of the smokable material to be heated by the heater in use.

In an exemplary embodiment, the combustion temperature of the smokable material is the autoignition temperature or kindling point of the smokable material.

In an exemplary embodiment, the Curie point temperature is no more than 350 degrees Celsius.

In respective exemplary embodiments, the Curie point temperature may be less than 350 degrees Celsius, less than 325 degrees Celsius, less than 300 degrees Celsius, less than 280 degrees Celsius, less than 260 degrees Celsius, less than 240 degrees Celsius, or less than 220 degrees Celsius.

In an exemplary embodiment, the method comprises forming an article comprising the heater and smokable material to be heated by the heater in use.

In an exemplary embodiment, the smokable material comprises tobacco and/or one or more humectants.

In an exemplary embodiment, the method comprises providing that the heater is in contact with the smokable material.

In an exemplary embodiment, the method comprises forming apparatus for heating smokable material to volatilize at least one component of the smokable material, the apparatus comprising a heating zone for receiving an article comprising smokable material, the heater for heating the heating zone, and a magnetic field generator for generating a varying magnetic field that penetrates the heating material; and a maximum temperature to which the heater is heatable by penetration with the varying magnetic field in use is exclusively determined by the Curie point temperature of the heating material.

In an exemplary embodiment, the heating material comprises one or more materials selected from the group consisting of: iron; an alloy comprising iron; an alloy comprising iron and nickel; an alloy comprising iron and nickel and chromium; an alloy comprising iron and nickel and chromium and manganese; an alloy comprising iron and nickel and chromium and manganese and silicon; and stainless steel.

In an exemplary embodiment, the heater consists entirely, or substantially entirely, of the heating material.

A second aspect of the present disclosure provides an article for use with apparatus for heating smokable material to volatilize at least one component of the smokable material, the article comprising: smokable material; and a heater for heating the smokable material, wherein the heater comprises heating material that is heatable by penetration with a varying magnetic field, and wherein the heating material has a Curie point temperature that is less than the combustion temperature of the smokable material.

In an exemplary embodiment, the combustion temperature of the smokable material is the autoignition temperature or kindling point of the smokable material.

In an exemplary embodiment, the heating material is in contact with the smokable material.

In an exemplary embodiment, the Curie point temperature is no more than 350 degrees Celsius.

In respective exemplary embodiments, the Curie point temperature may be less than 350 degrees Celsius, less than 325 degrees Celsius, less than 300 degrees Celsius, less than 280 degrees Celsius, less than 260 degrees Celsius, less than 240 degrees Celsius, or less than 220 degrees Celsius.

In an exemplary embodiment, the heating material comprises one or more materials selected from the group consisting of: iron; an alloy comprising iron; an alloy comprising iron and nickel; an alloy comprising iron and nickel and chromium; an alloy comprising iron and nickel and chromium and manganese; an alloy comprising iron and nickel and chromium and manganese and silicon; and stainless steel.

In an exemplary embodiment, the smokable material comprises tobacco and/or one or more humectants.

In an exemplary embodiment, the heater consists entirely, or substantially entirely, of the heating material.

A third aspect of the present disclosure provides apparatus for heating smokable material to volatilize at least one component of the smokable material, the apparatus comprising: a heating zone for receiving an article comprising smokable material; a heater for heating the heating zone, wherein the heater comprises heating material that is heatable by penetration with a varying magnetic field; and a magnetic field generator for generating a varying magnetic field that penetrates the heating material; wherein a maximum temperature to which the heater is heatable by penetration with the varying magnetic field in use is exclusively determined by a Curie point temperature of the heating material.

In an exemplary embodiment, the Curie point temperature is no more than 350 degrees Celsius.

In respective exemplary embodiments, the Curie point temperature may be less than 350 degrees Celsius, less than 325 degrees Celsius, less than 300 degrees Celsius, less than 280 degrees Celsius, less than 260 degrees Celsius, less than 240 degrees Celsius, or less than 220 degrees Celsius.

In an exemplary embodiment, the heating material comprises one or more materials selected from the group consisting of: iron; an alloy comprising iron; an alloy comprising iron and nickel; an alloy comprising iron and nickel and chromium; an alloy comprising iron and nickel and chromium and manganese; an alloy comprising iron and nickel and chromium and manganese and silicon; and stainless steel.

In an exemplary embodiment, the heater consists entirely, or substantially entirely, of the heating material.

A fourth aspect of the present disclosure provides a system, comprising: apparatus for heating the smokable material to volatilize at least one component of the smokable material; and an article for use with the apparatus, wherein the article comprises smokable material and a heater for heating the smokable material, wherein the heater is formed of heating material that is heatable by penetration with a varying magnetic field, and wherein the heating material has a Curie point temperature that is less than the combustion temperature of the smokable material; wherein the apparatus comprises a heating zone for receiving the article, and a magnetic field generator for generating a varying magnetic field that penetrates the heating material when the article is in the heating zone.

In respective exemplary embodiments, the article of the system may have any one or more of the features discussed above as being present in respective exemplary embodiments of the article of the second aspect of the present disclosure.

A fifth aspect of the present disclosure provides a system, comprising: apparatus for heating the smokable material to volatilize at least one component of the smokable material; and an article for use with the apparatus, wherein the article comprises smokable material; wherein the apparatus comprises: a heating zone for receiving the article, a heater for heating the smokable material when the article is in the heating zone, wherein the heater is formed of heating material that is heatable by penetration with a varying magnetic field, and a magnetic field generator for generating a varying magnetic field that penetrates the heating material; wherein a maximum temperature to which the heater is heatable by penetration with the varying magnetic field in use is exclusively determined by a Curie point temperature of the heating material.

In an exemplary embodiment, the article of the system is the article of the second aspect of the present disclosure. The article of the system may have any one or more of the features discussed above as being present in respective exemplary embodiments of the article of the second aspect of the present disclosure.

BRIEF DESCRIPTION OF THE DRAWINGS

Embodiments of the disclosure will now be described, by way of example only, with reference to the accompanying drawings, in which.

DETAILED DESCRIPTION

Figure 1:
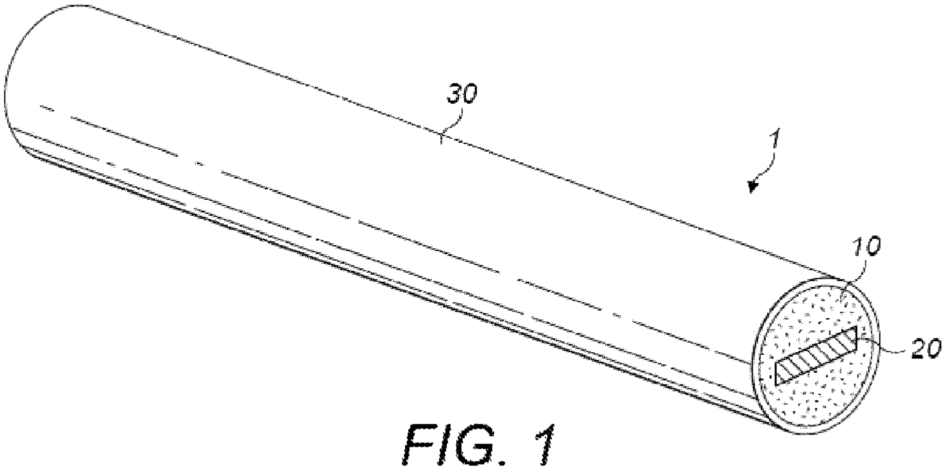
FIG. 1 shows a schematic perspective view of an example of an article for use with apparatus for heating smokable material to volatilize at least one component of the smokable material.

As used herein, the term “smokable material” includes materials that provide volatilized components upon heating, typically in the form of vapor or an aerosol. “Smokable material” may be a non-tobacco-containing material or a tobacco-containing material. “Smokable material” may, for example, include one or more of tobacco per se, tobacco derivatives, expanded tobacco, reconstituted tobacco, tobacco extract, homogenized tobacco or tobacco substitutes. The smokable material can be in the form of ground tobacco, cut rag tobacco, extruded tobacco, reconstituted tobacco, reconstituted smokable material, liquid, gel, gelled sheet, powder, or agglomerates, or the like. “Smokable material” also may include other, non-tobacco, products, which, depending on the product, may or may not contain nicotine. “Smokable material” may comprise one or more humectants, such as glycerol or propylene glycol.

As used herein, the term “heating material” or “heater material” refers to material that is heatable by penetration with a varying magnetic field.

Induction heating is a process in which an electrically-conductive object is heated by penetrating the object with a varying magnetic field. The process is described by Faraday’s law of induction and Ohm’s law. An induction heater may comprise an electromagnet and a device for passing a varying electrical current, such as an alternating current, through the electromagnet. When the electromagnet and the object to be heated are suitably relatively positioned so that the resultant varying magnetic field produced by the electromagnet penetrates the object, one or more eddy currents are generated inside the object. The object has a resistance to the flow of electrical currents. Therefore, when such eddy currents are generated in the object, their flow against the electrical resistance of the object causes the object to be heated. This process is called Joule, ohmic, or resistive heating. An object that is capable of being inductively heated is known as a susceptor.

It has been found that, when the susceptor is in the form of a closed circuit, magnetic coupling between the susceptor and the electromagnet in use is enhanced, which results in greater or improved Joule heating.

Magnetic hysteresis heating is a process in which an object made of a magnetic material is heated by penetrating the object with a varying magnetic field. A magnetic material can be considered to comprise many atomic-scale magnets, or magnetic dipoles. When a magnetic field penetrates such material, the magnetic dipoles align with the magnetic field. Therefore, when a varying magnetic field, such as an alternating magnetic field, for example as produced by an electromagnet, penetrates the magnetic material, the orientation of the magnetic dipoles changes with the varying applied magnetic field. Such magnetic dipole reorientation causes heat to be generated in the magnetic material.

When an object is both electrically-conductive and magnetic, penetrating the object with a varying magnetic field can cause both Joule heating and magnetic hysteresis heating in the object. Moreover, the use of magnetic material can strengthen the magnetic field, which can intensify the Joule heating.

In each of the above processes, as heat is generated inside the object itself, rather than by an external heat source by heat conduction, a rapid temperature rise in the object and more uniform heat distribution can be achieved, particularly through selection of suitable object material and geometry, and suitable varying magnetic field magnitude and orientation relative to the object. Moreover, as induction heating and magnetic hysteresis heating do not require a physical connection to be provided between the source of the varying magnetic field and the object, design freedom and control over the heating profile may be greater, and cost may be lower.

The Curie point temperature, or Curie Temperature, is the temperature at which certain magnetic materials undergo a sharp change in their magnetic properties. It is understood that the Curie point temperature is the temperature below which there is spontaneous magnetization in the absence of an externally applied magnetic field, and above which the material is paramagnetic. For example, the Curie point temperature is the magnetic transformation temperature of a ferromagnetic material between its ferromagnetic and paramagnetic phase. When such a magnetic material reaches its Curie point temperature, its magnetic permeability reduces or ceases, and the ability of the material to be heated by penetration with a varying magnetic field also reduces or ceases. That is, it may not be possible to heat the material above its Curie point temperature by magnetic hysteresis heating. If the magnetic material is electrically-conductive, then the material may still be heatable, to a lesser extent, by penetration with a varying magnetic field above the Curie point temperature by Joule heating. However, if the magnetic material is non-electrically-conductive, then heating of the material above its Curie point temperature by penetration with a varying magnetic field may be hindered or even impossible.

Figure 2:
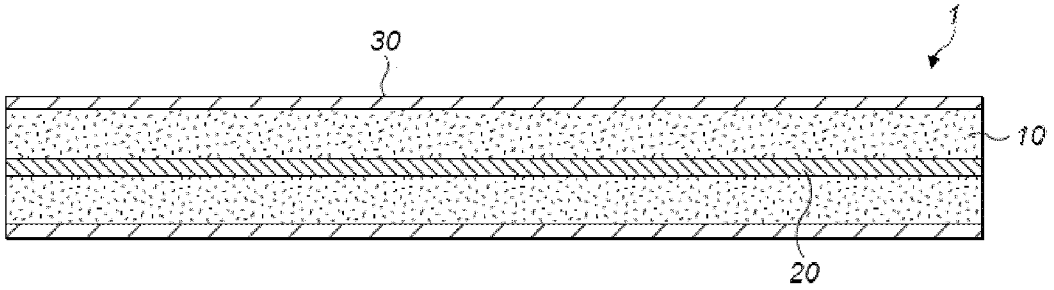
FIG. 2 shows a schematic cross-sectional view of the article of FIG. 1.

Referring to FIGS. 1 and 2 there are shown a schematic perspective view and a schematic cross-sectional view of an example of an article according to an embodiment of the disclosure. Broadly speaking, the article 1 comprises smokable material 10, a heater 20 for heating the smokable material 10, and a cover 30 that encircles the smokable material 10 and the heater 20. The heater 20 comprises heating material that is heatable by penetration with a varying magnetic field. Example such heating materials are discussed elsewhere herein. The article 1 is for use with apparatus for heating the smokable material 10 to volatilize at least one component of the smokable material 10 without burning the smokable material 10.

In this embodiment, the article 1 is elongate and cylindrical with a substantially circular cross section in a plane normal to a longitudinal axis of the article 1. However, in other embodiments, the article 1 may have a cross section other than circular and/or not be elongate and/or not be cylindrical. The article 1 may have proportions approximating those of a cigarette.

In this embodiment, the heater 20 is elongate and extends along a longitudinal axis that is substantially aligned with a longitudinal axis of the article 1. This can help to provide more uniform heating of the smokable material 10 in use, and can also aid manufacturing of the article 1. In this embodiment, the aligned axes are coincident. In a variation to this embodiment, the aligned axes may be parallel to each other. However, in other embodiments, the axes may be oblique to each other.

In this embodiment, the heater 20 extends to opposite longitudinal ends of the mass of smokable material 10. This can help to provide more uniform heating of the smokable material in use, and can also aid manufacturing of the article 1. However, in other embodiments, the heater 20 may not extend to either of the opposite longitudinal ends of the mass of smokable material 10, or may extend to only one of the longitudinal ends of the mass of smokable material and be spaced from the other of the longitudinal ends of the mass of smokable material 10.

In this embodiment, the heater 20 is within the smokable material 10. In other embodiments, the smokable material 10 may be on only one side of the heater 20, for example.

In this embodiment, the heating material of the heater 20 is in contact with the smokable material 10. Thus, when the heating material is heated by penetration with a varying magnetic field, heat may be transferred directly from the heating material to the smokable material 10. In other embodiments, the heating material may be kept out of contact with the smokable material 10. For example, in some embodiments, the article 1 may comprise a thermally-conductive barrier that is free of heating material and that spaces the heater 20 from the smokable material 10. In some embodiments, the thermally-conductive barrier may be a coating on the heater 20. The provision of such a barrier may be advantageous to help to dissipate heat to alleviate hot spots in the heating material.

The heater 20 of this embodiment has two opposing major surfaces joined by two minor surfaces. Therefore, the depth or thickness of the heater 20 is relatively small as compared to the other dimensions of the heater 20. The heating material may have a skin depth, which is an exterior zone within which most of an induced electrical current and/or induced reorientation of magnetic dipoles occurs. By providing that the heating material has a relatively small thickness, a greater proportion of the heating material may be heatable by a given varying magnetic field, as compared to heating material having a depth or thickness that is relatively large as compared to the other dimensions of the heating material. Thus, a more efficient use of material is achieved and, in turn, costs are reduced. However, in other embodiments, the heater 20 may have a cross-section that is a shape other than rectangular, such as circular, elliptical, annular, polygonal, square, triangular, star-shaped, radially-finned, or the like.

The cover 30 of the article 1 helps to maintain the relative positions of the smokable material 10 and the heater 20. The cover 30 may be made of any suitable material, such as paper, card, a plastics material, or the like. Overlapping portions of the cover 30 may be adhered to each other to help maintain the shape of the cover 30 and the article 1 as a whole. In some embodiments, the cover 30 may take a different form or be omitted.

The Curie point temperature of a material is determined or controlled by the chemical composition of the material.

Modern technology allows adjustment of the composition of a material to provide the material with a preset Curie point temperature. Some example heating materials that could be used in embodiments of the present disclosure, along with their approximate Curie point temperatures, are as shown in Table 1, below.

TABLE 1

| Material | Curie point temperature (degrees Celsius) |
|---|---|
| 30% Ni 70% Fe | 100 |
| 36% Ni 64% Fe | 279 |
| 42% Ni 58% Fe | 325 |
| 46% Ni 54% Fe | 460 |
| 52% Ni 48% Fe | 565 |
| 80% Ni 20% Fe | 460 |
| Cobalt | 1120 |
| Iron | 770 |
| Low carbon steel | 760 |
| Iron (III) oxide | 675 |
| Iron (II, III) oxide | 585 |
| $NiOFe_2O_3$ | 585 |
| $CuOFe_2O_3$ | 455 |
| Strontium ferrite | 450 |
| $MgOFe_2O_3$ | 440 |
| Kovar * | 435 |
| MnBi | 357 |
| Nickel | 353 |
| MnSb | 314 |
| $MnOFe_2O_3$ | 300 |
| $Y_3Fe_5O_{12}$ | 287 |
| $CrO_2$ | 113 |
| MnAs | 45 |

* A typical composition of Kovar is as follows, given in percentages of weight: Ni 29%, Co 17%, Si 0.2%, Mn 0.3%, C < 0.01%, Fe balance.

The % values given for the above various alloys of Ni and Fe may be % wt values.

"Low Curie temperature material for induction heating self-temperature controlling system"; T. Todaka et al.; Journal of Magnetism and Magnetic Materials 320 (2008) e702-e707, presents low Curie temperature magnetic materials for induction heating. The materials are alloys based on SUS430 (a grade of stainless steel), could be used in embodiments of the present disclosure, and are shown in Table 2, below, along with their approximate Curie point temperatures.

TABLE 2

| Material Composition (wt %) | Curie point temperature (degrees Celsius) |
|---|---|
| SUS430-$Al_{11.7}Dy_{0.5}$ | 301 |
| SUS430-$Al_{11.7}Gd_{0.3}$ | 300 |
| SUS430-$Al_{11.7}Sm_{0.3}$ | 300 |
| SUS430-$Al_{12.8}Gd_{0.3}$ | 194 |
| SUS430-$Al_{12.8}Sm_{0.1}$ | 195 |
| SUS430-$Al_{12.8}Y_{0.3}$ | 198 |
| SUS430-$Al_{13.5}Gd_{0.3}$ | 106 |
| SUS430-$Al_{13.5}Sm_{0.1}$ | 116 |
| SUS430-$Al_{13.5}Y_{0.3}$ | 109 |

"Low Curie temperature in Fe—Cr—Ni—Mn alloys"; Alexandru Iorga et al.; U.P.B. Sci. Bull., Series B, Vol. 73, Iss. 4 (2011) 195-202, provides a discussion of several Fe—Ni—Cr alloys. Some of the materials disclosed in this document could be used in embodiments of the present disclosure, and are shown in Table 3, below, along with their approximate Curie point temperatures.

TABLE 3

| Material Composition (wt %) | Curie point temperature (degrees Celsius) |
|---|---|
| $Cr_4$—$Ni_{32}$—$Fe_{62}$—$Mn_{1.5}$—$Si_{0.5}$ | 55 |
| $Cr_4$—$Ni_{33}$—$Fe_{62.5}$—$Si_{0.5}$ | 122 |
| $Cr_{10}$—Ni33—$Fe_{53.5}$—$Mn_3$—$Si_{0.5}$ | 11 |
| $Cr_{11}$—$Ni_{35}$—$Fe_{53.5}$—$Si_{0.5}$ | 66 |

A further material that could be used in some embodiments of the present disclosure is NeoMax MS-135, which is from NeoMax Materials Co., Ltd. This material is described at www.neomax-materials.co.jp.

In this embodiment, the chemical composition of the heating material of the heater 20 has been carefully and intentionally set, selected or provided so that the heating material has a Curie point temperature that is less than the combustion temperature of the smokable material 10. The combustion temperature may be the autoignition temperature or kindling point of the smokable material 10. That is, the lowest temperature at which the smokable material 10 will spontaneously ignite in normal atmosphere without an external source of ignition, such as a flame or spark.

Accordingly, when the temperature of the heater 20 in use reaches the Curie point temperature, the ability to further heat the heater 20 by penetration with a varying magnetic field is reduced or removed. For example, as noted above, when the heating material is electrically-conductive, Joule heating may still be effected by penetrating the heating material with a varying magnetic field. Alternatively, when the heating material is non-electrically-conductive, depending on the chemical composition of the heating material, such further heating by penetration with a varying magnetic field may be impossible.

Thus, in use, this inherent mechanism of the heating material of the heater 20 may be used to limit or prevent further heating of the heater 20, so as to help avoid the temperature of the adjacent smokable material 10 from reaching a magnitude at which the smokable material 10 burns or combusts. Thus, in some embodiments, the chemical composition of the heater 20 may help enable the smokable material 10 to be heated sufficiently to volatilize at least one component of the smokable material 10 without burning the smokable material 10. In some embodiments, this may also help to prevent overheating of the apparatus with which the article 1 is being used, and/or help to prevent part(s), such as the cover 30 or an adhesive, of the article 1 being damaged by excessive heat during use of the article 1.

In some embodiments, if the combustion temperature of the smokable material 10 is greater than X degrees Celsius, then the chemical composition of the heating material may be provided so that the Curie point temperature is no more than X degrees Celsius. For example, if the combustion temperature of the smokable material 10 is greater than 350 degrees Celsius, then the chemical composition of the heating material may be provided so that the Curie point temperature is no more than 350 degrees Celsius. The Curie point temperature may be, for example, less than 350 degrees Celsius, less than 325 degrees Celsius, less than 300 degrees Celsius, less than 280 degrees Celsius, less than 260 degrees Celsius, less than 240 degrees Celsius, or less than 220 degrees Celsius.

In some embodiments, the ability of the heating material to be heated by penetration with a varying magnetic field by magnetic hysteresis heating may return when the temperature of the heating material has dropped below the Curie point temperature.

In some embodiments, the heater 20 may consist entirely, or substantially entirely, of the heating material. The heating material may comprise, for example, one or more materials selected from the group consisting of: iron; an alloy comprising iron; an alloy comprising iron and nickel; an alloy comprising iron and nickel and chromium; an alloy comprising iron and nickel and chromium and manganese; an alloy comprising iron and nickel and chromium and manganese and silicon; and stainless steel.

In some embodiments, the heater of the product, such as the article, may comprise a first portion of heating material that has a first Curie point temperature, and a second portion of heating material that has a second Curie point temperature that is different to the first Curie point temperature. The second Curie point temperature may be higher than the first Curie point temperature. In use, the second portion of heating material may thus be permitted to reach a higher temperature than the first portion of heating material when both are penetrated by a varying magnetic field. This may help progressive heating of the smokable material 10, and thus progressive generation of vapor, to be achieved. Both the first and second Curie point temperatures may be less than the combustion temperature of the smokable material 10.

Figure 4:
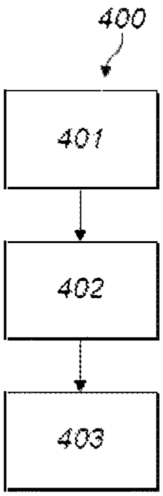
FIG. 4 is a flow diagram showing an example of a method of manufacturing an article for use with apparatus for heating smokable material to volatilize at least one component of the smokable material.

Referring to FIG. 4, there is shown a flow diagram showing an example of a method of manufacturing a product for use in heating smokable material to volatilize at least one component of the smokable material, according to an embodiment of the disclosure. The article 1 of FIGS. 1 and 2 may be made according to this method.

The method 400 comprises determining 401 a maximum temperature to which a heater is to be heated in use. This determining 401 may comprise, for example, determining the combustion temperature of the smokable material 10 to be heated by the heater 20 in use, and then determining the maximum temperature on the basis of that combustion temperature. For example, in some embodiments, the maximum temperature may be less than the combustion temperature of the smokable material 10, for the reasons discussed above. In other embodiments, the determining 401 may additionally or alternatively comprise determining a maximum temperature to which other part(s), such as a cover or an adhesive, of the article may be subjected in use without incurring damage, and then determining the maximum temperature on the basis of that temperature. For example, in some embodiments, the maximum temperature may be less than the temperature to which the part(s) may be safely subjected in use. In still other embodiments, the determining 401 may additionally or alternatively comprise determining a maximum temperature to which the smokable material 10 is to be heated on the basis of desired sensory properties, and then determining the maximum temperature on the basis of that temperature. For example, at different temperatures different components of the smokable material 10 may be volatilized.

The method 400 further comprises providing 402 a heater 20 comprising heating material, wherein the heating material is heatable by penetration with a varying magnetic field, and wherein the heating material has a Curie point temperature selected or determined on the basis of, or in dependence on, the maximum temperature determined at 401. The providing 402 may comprise, for example, manufacturing the heater 20 from suitable heating material. The method may comprise adjusting the composition of the heating material during manufacture of the heater 20. Alternatively or additionally, the providing 402 may comprise selecting the heater 20 from a plurality of heaters 20, wherein the plurality of heaters 20 are made of heating material having respective different Curie point temperatures. The Curie point temperature of the heating material of the heater 20 provided in 402 may, for example, be equal to the maximum temperature determined in 401, or may be less than the maximum temperature determined in 401. The heater provided in 402 may consists entirely, or substantially entirely, of the heating material. The heating material may comprise or consist of any one or more of the available heating materials discussed above, for example.

The method then comprises forming 403 an article, such as the article 1 of FIGS. 1 and 2, comprising the heater 20 and smokable material 10 to be heated by the heater 20 in use. The forming 403 may comprise providing that the heater 20 is in contact with the smokable material 10, as is the case in the article 1 of FIGS. 1 and 2. However, in other embodiments, the smokable material 10 may be out of contact with the heater 20 and yet still be heatable by the heater 20. The forming 403 of the method 400 may additionally or alternatively comprise encircling or covering the smokable material 10 and the heater 20 with a cover, such as the cover 30 of the article 1 shown in FIGS. 1 and 2.

The above-described article 1 and described variants thereof may be used with apparatus for heating the smokable material 10 to volatilize at least one component of the smokable material without burning the smokable material 10. Any one of the article(s) 1 and such apparatus may be provided together as a system. The system may take the form of a kit, in which the article 1 is separate from the apparatus. Alternatively, the system may take the form of an assembly, in which the article 1 is combined with the apparatus. The apparatus of the system comprises a heating zone for receiving the article 1, and a magnetic field generator for generating a varying magnetic field that penetrates the heating material when the article 1 is in the heating zone.

Figure 3:
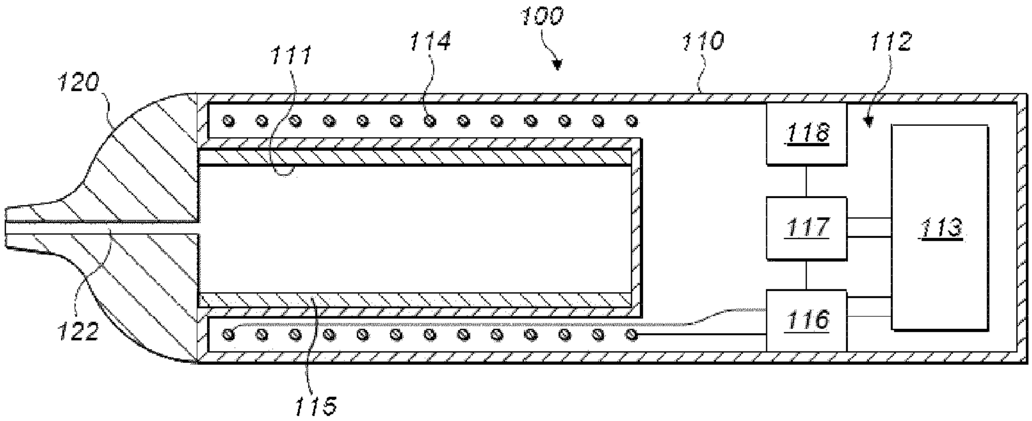
FIG. 3 shows a schematic cross-sectional view of an example of apparatus for heating smokable material to volatilize at least one component of the smokable material.

Referring to FIG. 3 there is shown a schematic cross-sectional view of an example of apparatus for heating smokable material to volatilize at least one component of the smokable material according to an embodiment of the disclosure. Broadly speaking, the apparatus 100 comprises a heating zone 111 for receiving an article comprising smokable material; a heater 115 for heating the heating zone 111, wherein the heater 115 comprises heating material that is heatable by penetration with a varying magnetic field; and a magnetic field generator 112 for generating a varying magnetic field that penetrates the heating material of the heater 115. A maximum temperature to which the heater 115 is heatable by penetration with the varying magnetic field in use is exclusively determined by a Curie point temperature of the heating material of the heater 115. Example such heating materials are discussed elsewhere herein. The apparatus 100 is for use with an article that comprises smokable material. In some embodiments, the apparatus 100 is for heating the smokable material to volatilize at least one component of the smokable material without burning the smokable material. The article may comprise heating material, such as the article 1 of FIGS. 1 and 2, or may be free of heating material.

The apparatus 100 of this embodiment comprises a body 110 and a mouthpiece 120. The mouthpiece 120 may be made of any suitable material, such as a plastics material, cardboard, cellulose acetate, paper, metal, glass, ceramic, or rubber. The mouthpiece 120 defines a channel 122 therethrough. The mouthpiece 120 is locatable relative to the body 110 so as to cover an opening into the heating zone 111. When the mouthpiece 120 is so located relative to the body 110, the channel 122 of the mouthpiece 120 is in fluid communication with the heating zone 111. In use, the channel 122 acts as a passageway for permitting volatilized material to pass from an article inserted in the heating zone 111 to an exterior of the apparatus 100. In this embodiment, the mouthpiece 120 of the apparatus 100 is releasably engageable with the body 110 so as to connect the mouthpiece 120 to the body 110. In other embodiments, the mouthpiece 120 and the body 110 may be permanently connected, such as through a hinge or flexible member. In some embodiments, such as embodiments in which the article itself comprises a mouthpiece, the mouthpiece 120 of the apparatus 100 may be omitted.

The apparatus 100 may define an air inlet that fluidly connects the heating zone 111 with the exterior of the apparatus 100. Such an air inlet may be defined by the body 110 of the apparatus 100 and/or by the mouthpiece 120 of the apparatus 100. A user may be able to inhale the volatilized component(s) of the smokable material by drawing the volatilized component(s) through the channel 122 of the mouthpiece 120. As the volatilized component(s) are removed from the article, air may be drawn into the heating zone 111 via the air inlet of the apparatus 100.

In this embodiment, the body 110 comprises the heating zone 111. In this embodiment, the heating zone 111 comprises a recess 111 for receiving at least a portion of the article. In other embodiments, the heating zone 111 may be other than a recess, such as a shelf, a surface, or a projection, and may require mechanical mating with the article in order to co-operate with, or receive, the article. In this embodiment, the heating zone 111 is elongate, and is sized and shaped to receive the article. In this embodiment, the heating zone 111 accommodates the whole article. In other embodiments, the heating zone 111 may be dimensioned to receive only a portion of the article.

In this embodiment, the magnetic field generator 112 comprises an electrical power source 113, a coil 114, a device 116 for passing a varying electrical current, such as an alternating current, through the coil 114, a controller 117, and a user interface 118 for user-operation of the controller 117.

In this embodiment, the electrical power source 113 is a rechargeable battery. In other embodiments, the electrical power source 113 may be other than a rechargeable battery, such as a non-rechargeable battery, a capacitor, a battery-capacitor hybrid, or a connection to a mains electricity supply.

The coil 114 may take any suitable form. In this embodiment, the coil 114 is a helical coil of electrically-conductive material, such as copper. In some embodiments, the magnetic field generator 112 may comprise a magnetically permeable core around which the coil 114 is wound. Such a magnetically permeable core concentrates the magnetic flux produced by the coil 114 in use and makes a more powerful magnetic field. The magnetically permeable core may be made of iron, for example. In some embodiments, the magnetically permeable core may extend only partially along the length of the coil 114, so as to concentrate the magnetic flux only in certain regions.

In this embodiment, the coil 114 is in a fixed position relative to the heater 115 and the heating zone 111. In this embodiment, the coil 114 encircles the heater 115 and the heating zone 111. In this embodiment, the coil 114 extends along a longitudinal axis that is substantially aligned with a longitudinal axis A-A of the heating zone 111. In this embodiment, the aligned axes are coincident. In a variation to this embodiment, the aligned axes may be parallel to each other. However, in other embodiments, the axes may be oblique to each other. Moreover, in this embodiment, the coil 114 extends along a longitudinal axis that is substantially coincident with a longitudinal axis of the heater 115. This can help to provide more uniform heating of the heater 115 in use, and can also aid manufacturability of the apparatus 100. In other embodiments, the longitudinal axes of the coil 114 and the heater 115 may be aligned with each other by being parallel to each other, or may be oblique to each other.

In this embodiment, the device 116 for passing a varying current through the coil 114 is electrically connected between the electrical power source 113 and the coil 114. In this embodiment, the controller 117 also is electrically connected to the electrical power source 113, and is communicatively connected to the device 116 to control the device 116. More specifically, in this embodiment, the controller 117 is for controlling the device 116, so as to control the supply of electrical power from the electrical power source 113 to the coil 114. In this embodiment, the controller 117 comprises an integrated circuit (IC), such as an IC on a printed circuit board (PCB). In other embodiments, the controller 117 may take a different form. In some embodiments, the apparatus may have a single electrical or electronic component comprising the device 116 and the controller 117. The controller 117 is operated in this embodiment by user-operation of the user interface 118. In this embodiment, the user interface 118 is located at the exterior of the body 110. The user interface 118 may comprise a push-button, a toggle switch, a dial, a touchscreen, or the like. In other embodiments, the user interface 118 may be remote and connected to the rest of the apparatus wirelessly, such as via Bluetooth.

In this embodiment, operation of the user interface 118 by a user causes the controller 117 to cause the device 116 to cause an alternating electrical current to pass through the coil 114, so as to cause the coil 114 to generate an alternating magnetic field. The coil 114 and the heater 115 of the apparatus 100 are suitably relatively positioned so that the alternating magnetic field produced by the coil 114 penetrates the heating material of the heater 115. When the heating material of the heater 115 is an electrically-conductive material, this may cause the generation of one or more eddy currents in the heating material. The flow of eddy currents in the heating material against the electrical resistance of the heating material causes the heating material to be heated by Joule heating. In this embodiment, the heating material is made of a magnetic material, and so the orientation of magnetic dipoles in the heating material changes with the changing applied magnetic field, which causes heat to be generated in the heating material.

A maximum temperature to which the heater 115 of the apparatus 100 is heatable by penetration with the varying magnetic field in use is exclusively determined by a Curie point temperature of the heating material of the heater 115. That is, the apparatus 100 may be free of any other system for limiting the temperature to which the heater 115 is heatable to below the maximum temperature. In this embodiment, the chemical composition of the heating material of the heater 115 of the apparatus 100 has been carefully and intentionally set, selected or provided so that the heating material has a Curie point temperature that is less than the combustion temperature of the smokable material in an article to be used with the apparatus 100. Accordingly, when the temperature of the heater 115 in use reaches the Curie point temperature, the ability to further heat the heater 115 by penetration with a varying magnetic field is reduced or removed, as discussed above.

Thus, in use, this inherent mechanism of the heating material of the heater 115 may be used to limit or prevent further heating of the heater 115, so as to help avoid the temperature of the heating zone 111 and an article located therein from reaching a magnitude at which the smokable material of the article burns or combusts. Thus, in some embodiments, the chemical composition of the heater 115 may help enable the smokable material to be heated sufficiently to volatilize at least one component of the smokable material without burning the smokable material. In some embodiments, this may also help to prevent overheating of the apparatus 100 or damage to components of the apparatus, such as the magnetic field generator 112.

As noted above, in some embodiments, the ability of the heating material to be heated by penetration with a varying magnetic field by magnetic hysteresis heating may return when the temperature of the heating material has dropped below the Curie point temperature.

In some embodiments, if the combustion temperature of the smokable material to be used with the apparatus 100 is greater than X degrees Celsius, then the chemical composition of the heating material may be provided so that the Curie point temperature is no more than X degrees Celsius. For example, if the combustion temperature of the smokable material is greater than 350 degrees Celsius, then the chemical composition of the heating material may be provided so that the Curie point temperature is no more than 350 degrees Celsius. The Curie point temperature may be, for example, less than 350 degrees Celsius, less than 325 degrees Celsius, less than 300 degrees Celsius, less than 280 degrees Celsius, less than 260 degrees Celsius, less than 240 degrees Celsius, or less than 220 degrees Celsius.

In some embodiments, the heater 115 may consist entirely, or substantially entirely, of the heating material. The heating material may comprise, for example, one or more materials selected from the group consisting of: iron; an alloy comprising iron; an alloy comprising iron and nickel; an alloy comprising iron and nickel and chromium; an alloy comprising iron and nickel and chromium and manganese; an alloy comprising iron and nickel and chromium and manganese and silicon; and stainless steel.

The apparatus 100 may comprise more than one coil. The plurality of coils of the apparatus 100 could be operable to provide progressive heating of the smokable material 10 in an article 1, and thereby progressive generation of vapor. For example, one coil may be able to heat a first region of the heating material relatively quickly to initialize volatilization of at least one component of the smokable material 10 and formation of a vapor in a first region of the smokable material 10. Another coil may be able to heat a second region of the heating material relatively slowly to initialize volatilization of at least one component of the smokable material 10 and formation of a vapor in a second region of the smokable material 10. Accordingly, a vapor is able to be formed relatively rapidly for inhalation by a user, and vapor can continue to be formed thereafter for subsequent inhalation by the user even after the first region of the smokable material may have ceased generating vapor. The initially-unheated second region of smokable material could act as a heat sink, to reduce the temperature of created vapor or make the created vapor mild, during heating of the first region of smokable material 10.

In some embodiments, the apparatus 100 may have a sensor for detecting a Curie-related change in magnetism of the heater 20, 115. The sensor may be communicatively-connected to the controller 117. The controller 117 may be configured to control the device 116 to cause the generation of the varying magnetic field to be halted or changed, on the basis of a signal received at the controller 117 from the sensor.

In some embodiments, the apparatus 100 may have an amplifier for amplifying the Curie-related change in magnetism of the heater 20, 115 of the article 1 or apparatus 100. For example, the coil 114 may be configured or arranged so that a change in a property of the coil 114 in response to the Curie-related change in magnetism of the heater 20, 115 is large. The impedance of the coil 114 may be matched with the impedance of the heater 20, 115, to result in a Curie-related event being more reliably detectable.

Figure 5:
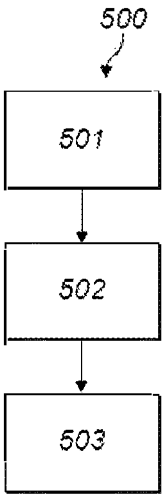
FIG. 5 is a flow diagram showing an example of a method of manufacturing apparatus for heating smokable material to volatilize at least one component of the smokable material.

Referring to FIG. 5, there is shown a flow diagram showing an example of a method of manufacturing a product for use in heating smokable material to volatilize at least one component of the smokable material, according to an embodiment of the disclosure. The apparatus 100 of FIG. 3 may be made according to this method.

The method 500 comprises determining 501 a maximum temperature to which a heater is to be heated in use. The determining 501 may comprise, for example, determining the combustion temperature of smokable material to be heated by the heater 115 in use, and then determining the maximum temperature on the basis of that combustion temperature. For example, in some embodiments, the maximum temperature may be less than the combustion temperature of the smokable material, for the reasons discussed above. In other embodiments, the determining 501 may additionally or alternatively comprise determining a maximum comfortable temperature to which the exterior of the apparatus 100 is to be permitted to reach in use while still being comfortable to hold by a user, and then determining the maximum temperature on the basis of that temperature. In still further embodiments, the determining 501 may additionally or alternatively comprise determining a maximum temperature to which components, such as electrical components, of the apparatus 100 may be subjected in use without incurring damage, and then determining the maximum temperature on the basis of that temperature.

The method further comprises providing 502 a heater 115 comprising heating material, wherein the heating material is heatable by penetration with a varying magnetic field, and wherein the heating material has a Curie point temperature selected or determined on the basis of, or in dependence on, the maximum temperature determined at 501. The providing 502 may comprise, for example, manufacturing the heater 115 from suitable heating material. The method may comprise adjusting the composition of the heating material during manufacture of the heater 115. Alternatively or additionally, the providing 502 may comprise selecting the heater 115 from a plurality of heaters 115, wherein the plurality of heaters 115 are made of heating material having respective different Curie point temperatures.

The Curie point temperature of the heating material of the heater 115 provided in 502 may, for example, be equal to the maximum temperature determined in 501, or may be less than the maximum temperature determined in 501. The heater 115 provided in 502 may consists entirely, or substantially entirely, of the heating material. The heating material may comprise or consist of any one or more of the available heating materials discussed above, for example.

The method then comprises forming 503 apparatus, such as the apparatus 100 of FIG. 3, that comprises a heating zone 111 for receiving an article comprising smokable material, the heater 115 for heating the heating zone 111, and a magnetic field generator 112 for generating a varying magnetic field that penetrates the heating material, wherein a maximum temperature to which the heater 115 is heatable by penetration with the varying magnetic field in use is exclusively determined by the Curie point temperature of the heating material.

In some embodiments, the forming 403 of the method 400 of FIG. 4, and/or the forming 503 of the method 500 of FIG. 5, may be omitted. For example, in some such embodiments, the product made using the method may be a component or system for future incorporation into apparatus for heating smokable material to volatilize at least one component of the smokable material. In some other such embodiments, the product made using the method may be a component or system for future incorporation into an article for use with such apparatus.

Accordingly, in accordance with some embodiments of the present disclosure, a product, such as the article 1 of FIGS. 1 and 2 or the apparatus 100 of FIG. 3, may be provided with an automatic mechanism for limiting the temperature to which a heater 20, 115 of the product is heatable by penetration with a varying magnetic field.

In each of the embodiments discussed above, the heating material may have a skin depth, which is an exterior zone within which most of an induced electrical current and/or induced reorientation of magnetic dipoles occurs. By providing that the component comprising the heating material has a relatively small thickness, a greater proportion of the heating material may be heatable by a given varying magnetic field, as compared to heating material in a component having a depth or thickness that is relatively large as compared to the other dimensions of the component. Thus, a more efficient use of material is achieved. In turn, costs are reduced.

In some embodiments, a component comprising the heating material may comprise discontinuities or holes therein. Such discontinuities or holes may act as thermal breaks to control the degree to which different regions of the smokable material 10 are heated in use. Areas of the heating material with discontinuities or holes therein may be heated to a lesser extent that areas without discontinuities or holes. This may help progressive heating of the smokable material 10, and thus progressive generation of vapor, to be achieved. Such discontinuities or holes may, on the other hand, be used to optimize the creation of complex eddy currents in use.

In each of the above described embodiments, the smokable material 10 comprises tobacco. However, in respective variations to each of these embodiments, the smokable material 10 may consist of tobacco, may consist substantially entirely of tobacco, may comprise tobacco and smokable material other than tobacco, may comprise smokable material other than tobacco, or may be free of tobacco. In some embodiments, the smokable material 10 may comprise a vapor or aerosol forming agent or a humectant, such as glycerol, propylene glycol, triacetin, or diethylene glycol.

In each of the above described embodiments, the article 1 is a consumable article. Once all, or substantially all, of the volatilizable component(s) of the smokable material 10 in the article 1 has/have been spent, the user may remove the article 1 from the apparatus and dispose of the article 1. The user may subsequently re-use the apparatus with another of the articles 1. However, in other respective embodiments, the article 1 may be non-consumable, and the apparatus and the article 1 may be disposed of together once the volatilizable component(s) of the smokable material has/have been spent.

In some embodiments, the apparatus 100 discussed above is sold, supplied or otherwise provided separately from the articles with which the apparatus 100 is usable. However, in some embodiments, the apparatus 100 and one or more of the articles may be provided together as a system. Similarly, in some embodiments, the article 1 discussed above is sold, supplied or otherwise provided separately from the apparatus with which the article 1 is usable. However, in some embodiments, one or more of the articles 1 may be provided together with the apparatus as a system. Such systems may be in the form of a kit or an assembly, possibly with additional components, such as cleaning utensils.

Embodiments of the disclosure could be implemented in a system comprising any one of the articles discussed herein, and any one of the apparatuses discussed herein. Heat generated in the heating material of the apparatus could be transferred to the article to heat, or further heat, the smokable material therein when the portion of the article is in the heating zone.

Some of the products discussed herein may be considered smoking industry products.

In order to address various issues and advance the art, the entirety of this disclosure shows by way of illustration and example various embodiments in which the claimed invention may be practiced and which provide for superior apparatus for heating smokable material to volatilize at least one component of the smokable material, superior articles for use with such apparatus, superior systems comprising such apparatus and such articles, and superior methods of manufacturing products comprising heaters. The advantages and features of the disclosure are of a representative sample of embodiments only, and are not exhaustive and/or exclusive. They are presented only to assist in understanding and teach the claimed and otherwise disclosed features. It is to be understood that advantages, embodiments, examples, functions, features, structures and/or other aspects of the disclosure are not to be considered limitations on the disclosure as defined by the claims or limitations on equivalents to the claims, and that other embodiments may be utilized and modifications may be made without departing from the scope and/or spirit of the disclosure. Various embodiments may suitably comprise, consist of, or consist in essence of, various combinations of the disclosed elements, components, features, parts, steps, means, etc. The disclosure may include other inventions not presently claimed, but which may be claimed in future.

What is claimed is:

1. An article for use with an apparatus for heating smokable material to volatilize the smokable material, the article comprising:

the smokable material; and a heater for heating the smokable material;

wherein the heater comprises heating material that is heatable by penetration with a varying magnetic field, the heating material comprising a plurality of discontinuities or holes; and wherein the heating material comprises a first portion of the heating material that has a first Curie point temperature and a second portion of the heating material that has a second Curie point temperature that is different from the first Curie point temperature.

2. The article of claim 1, wherein the heating material is in contact with the smokable material.

3. The article of claim 1, wherein at least one of the first or second Curie point temperatures is less than a combustion temperature of the smokable material.

4. The article of claim 1, wherein at least one of the first or second Curie point temperatures are no more than 350 degrees Celsius.

5. The article of claim 1, wherein the heating material comprises one or more materials selected from the group consisting of:

iron;

an alloy comprising iron; an alloy comprising iron and nickel;

an alloy comprising iron and nickel and chromium;

an alloy comprising iron and nickel and chromium and manganese;

an alloy comprising iron and nickel and chromium and manganese and silicon; and stainless steel.

6. The article of claim 1, wherein the smokable material comprises tobacco and/or one or more humectants.

7. The article of claim 1, wherein the heater consists entirely, or substantially entirely, of the heating material.

8. The article of claim 1, wherein the heater comprises a thermally-conductive coating.

9. The article of claim 1, comprising a sensor for detecting a Curie-related change in magnetism of the heater, and a controller configured to control the heater to cause generation of the varying magnetic field to be halted or changed based on a signal received from the sensor.

10. An article for use with an apparatus for heating smokable material to volatilize the smokable material, the article comprising:

the smokable material; and a heater for heating the smokable material, wherein the heater comprises heating material that is heatable by penetration with a varying magnetic field the heating material comprising a plurality of discontinuities or holes;

wherein the heater comprises a thermally-conductive coating.

11. The article of claim 10, wherein the heater material has a Curie point temperature that is less than a combustion temperature of the smokable material.

12. The article of claim 10, wherein the heater material has a Curie point temperature of no more than 350 degrees Celsius.

13. An apparatus for heating smokable material to volatilize the smokable material, the apparatus comprising:

a heating zone for receiving an article comprising the smokable material;

a heater for heating the heating zone, wherein the heater comprises heating material that is heatable by penetration with a varying magnetic field, the heating material comprising a plurality of discontinuities or holes; and a magnetic field generator for generating a varying magnetic field that penetrates the heating material;

wherein the heating material comprises a first portion of the heating material that has a first Curie point temperature and a second portion of the heating material that has a second Curie point temperature that is different to the first Curie point temperature.

14. The apparatus of claim 13, wherein the heating material comprises one or more materials selected from the group consisting of:

iron;

an alloy comprising iron;

an alloy comprising iron and nickel;

an alloy comprising iron and nickel and chromium;

an alloy comprising iron and nickel and chromium and manganese;

an alloy comprising iron and nickel and chromium and manganese and silicon; and stainless steel.

15. The apparatus of claim 13, wherein the heater consists entirely, or substantially entirely, of the heating material.

16. The apparatus of claim 13, wherein the heater comprises a thermally-conductive coating.

17. An apparatus for heating smokable material to volatilize the smokable material, the apparatus comprising:

a heating zone for receiving an article comprising the smokable material;

a heater for heating the heating zone, wherein the heater comprises heating material that is heatable by penetration with a varying magnetic field, the heating material comprising a plurality of discontinuities or holes; and a magnetic field generator for generating a varying magnetic field that penetrates the heating material;

wherein the heater comprises a thermally-conductive coating.

18. An apparatus according to claim 13 further comprising the article comprising the smokable material; and wherein article is disposed in the heating zone.

19. A method of manufacturing a product comprising a heater for use in heating smokable material to volatilize at least one component of the smokable material, the method comprising:

determining a maximum temperature to which the heater is to be heated in use; and providing a heater comprising heating material, wherein the heating material is heatable by penetration with a varying magnetic field, the heating material comprising a plurality of discontinuities or holes, wherein the heating material has a Curie point temperature selected based on the determined maximum temperature, and wherein the heating material comprises a first portion of the heating material that has a first Curie point temperature and a second portion of the heating material that has a second Curie point temperature that is different from the first Curie point temperature.

20. A method of manufacturing a product comprising a heater for use in heating smokable material to volatilize at least one component of the smokable material, the method comprising:

determining a maximum temperature to which the heater is to be heated in use; and providing a heater comprising heating material, wherein the heating material is heatable by penetration with a varying magnetic field, the heating materiel comprising a plurality of discontinuities or holes, wherein the heating material has a Curie point temperature selected based on the determined maximum temperature, and wherein the heater comprises a thermally-conductive coating.

* * * * *